United States Patent
Murai et al.

(10) Patent No.: US 11,539,248 B2
(45) Date of Patent: Dec. 27, 2022

(54) WIRELESS POWER TRANSMITTER APPARATUS CAPABLE OF DETERMINING PAIRING OF WIRELESS POWER TRANSMITTER APPARATUSES AND WIRELESS POWER RECEIVER APPARATUSES AND TRANSMITTING SUFFICIENT POWER

(71) Applicant: OMRON CORPORATION, Kyoto (JP)

(72) Inventors: Akito Murai, Nara (JP); Tetsuya Nosaka, Ibaraki (JP); Junji Obata, Osaka (JP)

(73) Assignee: OMRON CORPORATION, Kyoto (JP)

( * ) Notice: Subject to any disclaimer, the term of this patent is extended or adjusted under 35 U.S.C. 154(b) by 59 days.

(21) Appl. No.: 17/274,985

(22) PCT Filed: Mar. 14, 2019

(86) PCT No.: PCT/JP2019/010631
§ 371 (c)(1),
(2) Date: Mar. 10, 2021

(87) PCT Pub. No.: WO2020/183722
PCT Pub. Date: Sep. 17, 2020

(65) Prior Publication Data
US 2022/0060059 A1    Feb. 24, 2022

(51) Int. Cl.
*H02J 50/80* (2016.01)
*H02J 50/20* (2016.01)
*H02J 50/40* (2016.01)

(52) U.S. Cl.
CPC .............. *H02J 50/80* (2016.02); *H02J 50/20* (2016.02); *H02J 50/40* (2016.02)

(58) Field of Classification Search
CPC .............. H02J 50/80; H02J 50/40; H02J 50/20
See application file for complete search history.

(56) References Cited

U.S. PATENT DOCUMENTS

| 10,164,469 B1* | 12/2018 | Jadidian | H02J 50/90 |
| 2013/0154387 A1* | 6/2013 | Lee | H02J 50/80 307/104 |

(Continued)

FOREIGN PATENT DOCUMENTS

| JP | 2018148619 A | 9/2018 |
| WO | 2012111271 A1 | 8/2012 |

(Continued)

OTHER PUBLICATIONS

International Search Report for International Application No. PCT/JP2019/010631; dated Jun. 4, 2019.

(Continued)

*Primary Examiner* — Daniel Cavallari
*Assistant Examiner* — Joseph N Inge
(74) *Attorney, Agent, or Firm* — Cantor Colburn LLP

(57) ABSTRACT

A power estimator calculates first estimated power values based on levels of test signals received from power receiver apparatuses, each first estimated power value indicating estimated received power of a corresponding power receiver apparatus when a power transmitter apparatus transmits power to the power receiver apparatuses. A signal transmitting circuit transmits each first estimated power value to a corresponding power receiver apparatus. A signal receiving circuit receives second estimated power values from the power receiver apparatuses, each second estimated power value indicating estimated received power of a corresponding power receiver apparatus when other power transmitter apparatuses transmit power to the power receiver apparatuses. A power transmitter control circuit determines pairing of the power transmitter apparatuses and the power receiver (Continued)

apparatuses for power transmission, based on the first and second estimated power values, so that estimated received power of each power receiver apparatus is equal to or higher than a threshold.

6 Claims, 20 Drawing Sheets

(56) References Cited

U.S. PATENT DOCUMENTS

| | | | | |
|---|---|---|---|---|
| 2013/0328417 | A1* | 12/2013 | Takeuchi | H02J 50/80 307/149 |
| 2014/0184147 | A1 | 7/2014 | Uchida | |
| 2016/0033254 | A1* | 2/2016 | Zeine | H02J 50/20 307/104 |
| 2016/0301256 | A1* | 10/2016 | Zeine | H02J 50/80 |
| 2016/0301264 | A1* | 10/2016 | Zeine | H02J 50/40 |
| 2018/0145545 | A1* | 5/2018 | Azami | H02J 50/12 |
| 2018/0254671 | A1* | 9/2018 | Murata | H04W 52/42 |

FOREIGN PATENT DOCUMENTS

| | | |
|---|---|---|
| WO | 2013035873 A1 | 3/2013 |
| WO | 2017006482 A1 | 1/2017 |

OTHER PUBLICATIONS

PCT Written Opinion of the International Searching Authority for International Application No. PCT/JP2019/010631; dated Jun. 4, 2019.

EPO Extended Search Report for corresponding EP Application No. 19919241.0; dated Jan. 7, 2022.

* cited by examiner

FIG. 17

|  | POWER RECEIVER APPARATUS 2-1 | POWER RECEIVER APPARATUS 2-2 | POWER RECEIVER APPARATUS 2-3 |
|---|---|---|---|
| POWER TRANSMITTER APPARATUS 1-1 | -10 | -5 | -40 |
| POWER TRANSMITTER APPARATUS 1-2 |  |  |  |
| POWER TRANSMITTER APPARATUS 1-3 |  |  |  |

FIG. 18

|  | POWER RECEIVER APPARATUS 2-1 | POWER RECEIVER APPARATUS 2-2 | POWER RECEIVER APPARATUS 2-3 |
|---|---|---|---|
| POWER TRANSMITTER APPARATUS 1-1 |  |  |  |
| POWER TRANSMITTER APPARATUS 1-2 | -20 | -40 | -20 |
| POWER TRANSMITTER APPARATUS 1-3 |  |  |  |

FIG. 19

|  | POWER RECEIVER APPARATUS 2-1 | POWER RECEIVER APPARATUS 2-2 | POWER RECEIVER APPARATUS 2-3 |
|---|---|---|---|
| POWER TRANSMITTER APPARATUS 1-1 |  |  |  |
| POWER TRANSMITTER APPARATUS 1-2 |  |  |  |
| POWER TRANSMITTER APPARATUS 1-3 | -40 | -15 | -15 |

FIG. 20

|  | ESTIMATED POWER VALUE | PAIRING |
|---|---|---|
| POWER TRANSMITTER APPARATUS 1-1 | -10 | NOT DETERMINED |
| POWER TRANSMITTER APPARATUS 1-2 | -20 | NOT DETERMINED |
| POWER TRANSMITTER APPARATUS 1-3 | -40 | NOT DETERMINED |

FIG. 21

|  | ESTIMATED POWER VALUE | PAIRING |
|---|---|---|
| POWER TRANSMITTER APPARATUS 1-1 | -5 | NOT DETERMINED |
| POWER TRANSMITTER APPARATUS 1-2 | -40 | NOT DETERMINED |
| POWER TRANSMITTER APPARATUS 1-3 | -15 | NOT DETERMINED |

FIG. 22

|  | ESTIMATED POWER VALUE | PAIRING |
|---|---|---|
| POWER TRANSMITTER APPARATUS 1-1 | -40 | NOT DETERMINED |
| POWER TRANSMITTER APPARATUS 1-2 | -20 | NOT DETERMINED |
| POWER TRANSMITTER APPARATUS 1-3 | -15 | NOT DETERMINED |

FIG. 23

|  | POWER RECEIVER APPARATUS 2-1 | POWER RECEIVER APPARATUS 2-2 | POWER RECEIVER APPARATUS 2-3 |
|---|---|---|---|
| POWER TRANSMITTER APPARATUS 1-1 | -10 | -5 | -40 |
| POWER TRANSMITTER APPARATUS 1-2 | -20 | -40 | -20 |
| POWER TRANSMITTER APPARATUS 1-3 | -40 | -15 | -15 |

FIG. 24

|  | POWER RECEIVER APPARATUS 2-1 | POWER RECEIVER APPARATUS 2-2 | POWER RECEIVER APPARATUS 2-3 |
|---|---|---|---|
| POWER TRANSMITTER APPARATUS 1-1 | -10 | -5 |  |
| POWER TRANSMITTER APPARATUS 1-2 | -20 | -40 |  |
| POWER TRANSMITTER APPARATUS 1-3 | -40 | -15 |  |

FIG. 25

|  | POWER RECEIVER APPARATUS 2-1 | POWER RECEIVER APPARATUS 2-2 | POWER RECEIVER APPARATUS 2-3 |
|---|---|---|---|
| POWER TRANSMITTER APPARATUS 1-1 | -10 |  | -40 |
| POWER TRANSMITTER APPARATUS 1-2 | -20 |  | -20 |
| POWER TRANSMITTER APPARATUS 1-3 | -40 |  | -15 |

FIG. 26

|  | POWER RECEIVER APPARATUS 2-1 | POWER RECEIVER APPARATUS 2-2 | POWER RECEIVER APPARATUS 2-3 |
|---|---|---|---|
| POWER TRANSMITTER APPARATUS 1-1 |  | -5 | -40 |
| POWER TRANSMITTER APPARATUS 1-2 |  | -40 | -20 |
| POWER TRANSMITTER APPARATUS 1-3 |  | -15 | -15 |

WIRELESS POWER TRANSMITTER APPARATUS CAPABLE OF DETERMINING PAIRING OF WIRELESS POWER TRANSMITTER APPARATUSES AND WIRELESS POWER RECEIVER APPARATUSES AND TRANSMITTING SUFFICIENT POWER

CROSS REFERENCE TO RELATED APPLICATIONS

This is the U.S. national stage of application No. PCT/JP2019/010631 filed on Mar. 14, 2019. Priority of which is hereby claimed and the disclosure of which is also incorporated herein by reference.

TECHNICAL FIELD

The present disclosure relates to a wireless power transmitter apparatus for a wireless power transmission system including a plurality of wireless power transmitter apparatuses and a plurality of wireless power receiver apparatuses, and also relates to a wireless power transmission system including such a wireless power transmitter apparatus.

BACKGROUND ART

For example, a wireless power transmission system including a plurality of wireless power transmitter apparatuses and a plurality of wireless power receiver apparatuses may be constructed in order to supply power to each of a plurality of sensors in a sensor network including the sensors.

For example, Patent Document 1 discloses a wireless power supply system including a plurality of power transmitters and a plurality of power receivers.

CITATION LIST

Patent Documents

PATENT DOCUMENT 1: Japanese patent laid-open publication No. JP 2018-148619 A

SUMMARY OF INVENTION

Technical Problem

In a wireless power transmission system including a plurality of wireless power transmitter apparatuses and a plurality of wireless power receiver apparatuses, the pairing (combinations) of the wireless power transmitter apparatuses and the wireless power receiver apparatuses for power transmission can be determined in various manners. However, depending on the positional relationship between the wireless power transmitter apparatus and the wireless power receiver apparatus, or depending on the surrounding environment, interference may occur due to reflection or diffraction of radio waves, and the power available to the wireless power receiver apparatus may decrease. In some cases, the power available to the wireless power receiver apparatus may decreases below the lower limit power at which the wireless power receiver apparatus operates. Therefore, it is required to determine the combinations of the wireless power transmitter apparatuses and the wireless power receiver apparatuses so as to transmit sufficient power to all the wireless power receiver apparatuses.

When determining the combinations of the wireless power transmitter apparatuses and the wireless power receiver apparatuses, the processing that can be performed by the wireless power receiver apparatus may be limited depending on the power consumption of the wireless power receiver apparatus, and depending on the power that can be supplied from the wireless power transmitter apparatus to the wireless power receiver apparatus. For example, complex signal processing by a wireless power receiver apparatus (for example, estimation of received power), communication among a plurality of wireless power receiver apparatuses, and the like may be impossible or difficult to perform due to the defect of power available to the wireless power receiver apparatus. Therefore, it is required to determine the combinations of the wireless power transmitter apparatuses and the wireless power receiver apparatuses without significantly increasing the power consumption of the wireless power receiver apparatuses.

An object of the present disclosure is to provide a wireless power transmitter apparatus capable of determining combinations of a plurality of wireless power transmitter apparatuses and a plurality of wireless power receiver apparatuses so as to transmit sufficient power to all the wireless power receiver apparatuses in a wireless power transmission system including the wireless power transmitter apparatuses and the wireless power receiver apparatuses. In addition, another object of the present disclosure is to provide a wireless power transmission system including such a wireless power transmitter apparatus.

Solution to Problem

According to a wireless power transmitter apparatus of an aspect of the present disclosure, a wireless power transmitter apparatus is provided for a wireless power transmission system including a plurality of wireless power transmitter apparatuses and a plurality of wireless power receiver apparatuses. the wireless power transmitter apparatus is provided with: a power estimator, a signal transmitting circuit, a signal receiving circuit, a power transmitter control circuit, and a power transmitting circuit. The power estimator calculates a plurality of first estimated power values, each of the first estimated power values indicating estimated received power of a corresponding one of the wireless power receiver apparatuses when the wireless power transmitter apparatus transmits power to the plurality of wireless power receiver apparatuses. The signal transmitting circuit transmits each of the first estimated power values to a corresponding one of the wireless power receiver apparatuses. The signal receiving circuit receives a plurality of second estimated power values from the wireless power receiver apparatuses, each of the second estimated power values indicating estimated received power of a corresponding one of the wireless power receiver apparatuses when other wireless power transmitter apparatuses of the wireless power transmission system transmit power to the wireless power receiver apparatuses. The power transmitter control circuit determines pairing of the wireless power transmitter apparatuses and the wireless power receiver apparatuses for power transmission, based on the first and second estimated power values, so that estimated received power of each of the wireless power receiver apparatuses is equal to or higher than a predetermined threshold. The power transmitting circuit transmits power to one of the wireless power receiver apparatuses corresponding to the wireless power transmitter apparatus, based on the determined pairing. The power estimator calculates each of the first estimated power values based on a signal level of a test signal received from each of the wireless power receiver apparatuses.

Thus, it is possible to determine combinations of the plurality of wireless power transmitter apparatuses and the plurality of wireless power receiver apparatuses so as to transmit sufficient power to all the wireless power receiver apparatuses in the wireless power transmission system including the wireless power transmitter apparatuses and the wireless power receiver apparatuses.

According to the wireless power transmitter apparatus of the aspect of the present disclosure, the power transmitter control circuit determines the pairing of the wireless power transmitter apparatuses and the wireless power receiver apparatuses for power transmission, so as to maximize total estimated received power of the plurality of wireless power receiver apparatuses based on the first and second estimated power values.

Thus, it is possible to determine combinations of the wireless power transmitter apparatuses and the wireless power receiver apparatuses for power transmission, so as to maximize the total estimated received power of the wireless power receiver apparatuses According to the wireless power transmitter apparatus of the aspect of the present disclosure, the signal transmitting circuit transmits first pairing information indicating the determined pairing, to each of the wireless power receiver apparatuses. The signal receiving circuit receives second pairing information from each of the wireless power receiver apparatuses, the second pairing information indicating pairing determined by the other wireless power transmitter apparatuses of the wireless power transmission system. The power transmitter control circuit determines the pairing of the wireless power transmitter apparatus so as to exclude wireless power receiver apparatuses included in the pairing determined by the other wireless power transmitter apparatuses of the wireless power transmission system.

Thus, it is possible to determine combinations of the wireless power transmitter apparatuses and the wireless power receiver apparatuses so that contention of the power receiver apparatuses does not occur.

According to the wireless power transmitter apparatus of the aspect of the present disclosure, the wireless power transmitter apparatus is provided with an antenna device having variable directivity.

Thus, it is possible to improve efficiency in power transmission and communication in the wireless power transmission system.

According to a wireless power transmission system of another aspect of the present disclosure, a wireless power transmission system includes: a plurality of the wireless power transmitter apparatuses; and a plurality of wireless power receiver apparatuses.

Thus, it is possible to determine determining combinations of the plurality of wireless power transmitter apparatuses and the plurality of wireless power receiver apparatuses so as to transmit sufficient power to all the wireless power receiver apparatuses in the wireless power transmission system including the wireless power transmitter apparatuses and the wireless power receiver apparatuses.

According to the wireless power transmission system of the aspect of the present disclosure, the wireless power receiver apparatus is provided with a sensor for measuring a predetermined physical quantity, and wirelessly transmits the physical quantity measured by the sensor to the wireless power transmitter apparatus.

Thus, for example, it is possible to supply power to each of a plurality of sensors in a sensor network including the sensors.

Advantageous Effects of Invention

According to the wireless power transmission system of the aspect of the present disclosure, it is possible to determine the combinations of the plurality of wireless power transmitter apparatuses and the plurality of wireless power receiver apparatuses so as to transmit sufficient power to all the wireless power receiver apparatuses in the wireless power transmission system including the wireless power transmitter apparatuses and the wireless power receiver apparatuses.

BRIEF DESCRIPTION OF DRAWINGS

FIG. 17 is a diagram showing an exemplary power table of the power transmitter apparatus 1-1 generated by the power transmitter apparatus 1-1 of FIG. 1 performing the received-power estimation process of step S2 in FIG. 8.

FIG. 18 is a diagram showing an exemplary power table of the power transmitter apparatus 1-2 generated by the power transmitter apparatus 1-2 of FIG. 1 performing the received-power estimation process of step S2 in FIG. 8.

FIG. 19 is a diagram showing an exemplary power table of the power transmitter apparatus 1-3 generated by the power transmitter apparatus 1-3 of FIG. 1 performing the received-power estimation process of step S2 in FIG. 8.

FIG. 20 is a diagram showing an exemplary power table of the power receiver apparatus 2-1 generated by the power transmitter apparatuses 1-1 to 1-3 of FIG. 1 performing the received-power estimation process of step S2 in FIG. 8.

FIG. 21 is a diagram showing an exemplary power table of the power receiver apparatus 2-2 generated by the power transmitter apparatuses 1-1 to 1-3 of FIG. 1 performing the received-power estimation process of step S2 in FIG. 8.

FIG. 22 is a diagram showing an exemplary power table of the power receiver apparatus 2-3 generated by the power transmitter apparatuses 1-1 to 1-3 of FIG. 1 performing the received-power estimation process of step S2 in FIG. 8.

FIG. 23 is a diagram showing an exemplary power table of the power transmitter apparatuses 1-1 to 1-3 generated by the power transmitter apparatuses 1-1 to 1-3 of FIG. 1 performing the pairing process of step S3 in FIG. 8.

FIG. 24 is a diagram showing an exemplary power table of the power transmitter apparatus 1-1 generated when the power transmitter apparatus 1-1 of FIG. 1 cannot communicate with the power receiver apparatus 2-3.

FIG. 25 is a diagram showing an exemplary power table of the power transmitter apparatus 1-2 generated when the power transmitter apparatus 1-2 of FIG. 1 cannot communicate with the power receiver apparatus 2-2.

FIG. 26 is a diagram showing an exemplary power table of the power transmitter apparatus 1-3 generated when the power transmitter apparatus 1-3 of FIG. 1 cannot communicate with the power receiver apparatus 2-1.

DESCRIPTION OF EMBODIMENT

Figure 1:
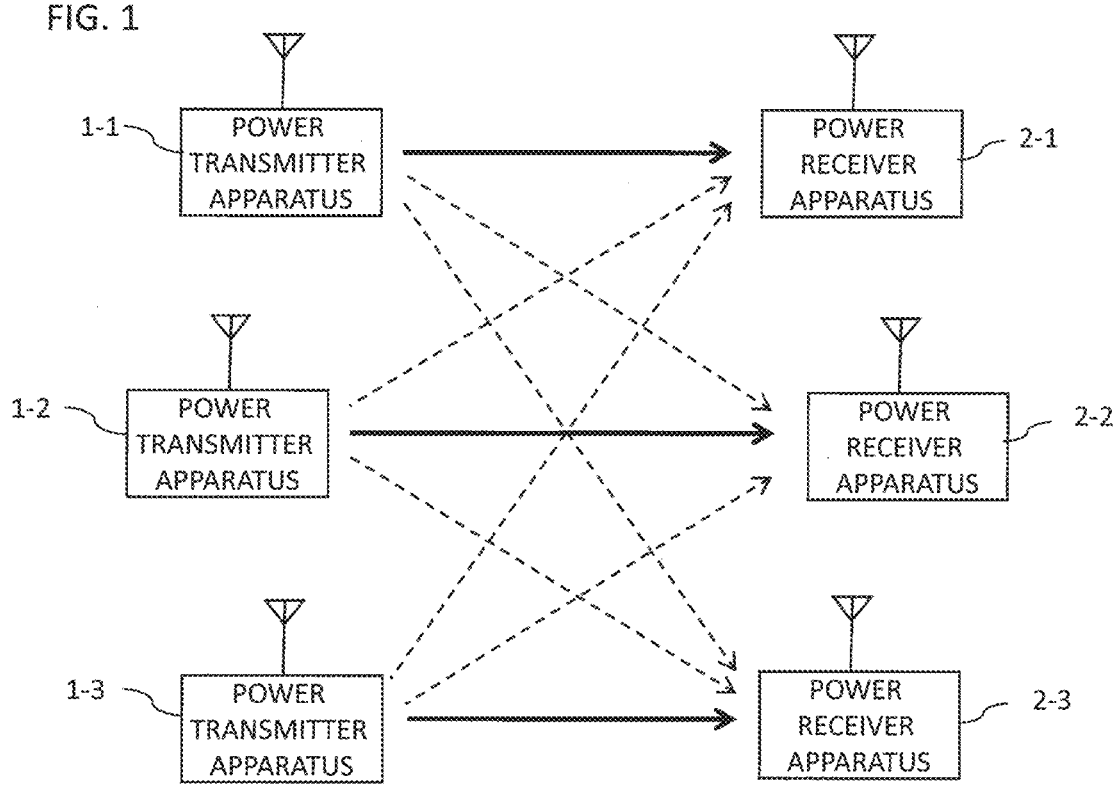
FIG. 1 is a block diagram showing a wireless power transmission system according to an embodiment.

Hereinafter, an embodiment according to one aspect of the present disclosure (hereinafter, also referred to as "the present embodiment") will be described with reference to the drawings. In the drawings, the same reference sign indicates similar components.

Application Example

FIG. 1 is a block diagram showing a wireless power transmission system according to an embodiment. The wireless power transmission system includes a plurality of power transmitter apparatuses 1-1 to 1-3 and a plurality of power receiver apparatuses 2-1 to 2-3.

In the present specification, the power transmitter apparatuses 1-1 to 1-3 are also collectively referred to as "power transmitter apparatus 1", and the power receiver apparatuses 2-1 to 2-3 are also collectively referred to as "power receiver apparatus 2". In addition, in the present specification, the power transmitter apparatus 1 is also referred to as a "wireless power transmitter apparatus", and the power receiver apparatus 2 is also referred to as a "wireless power receiver apparatus".

Figure 2:
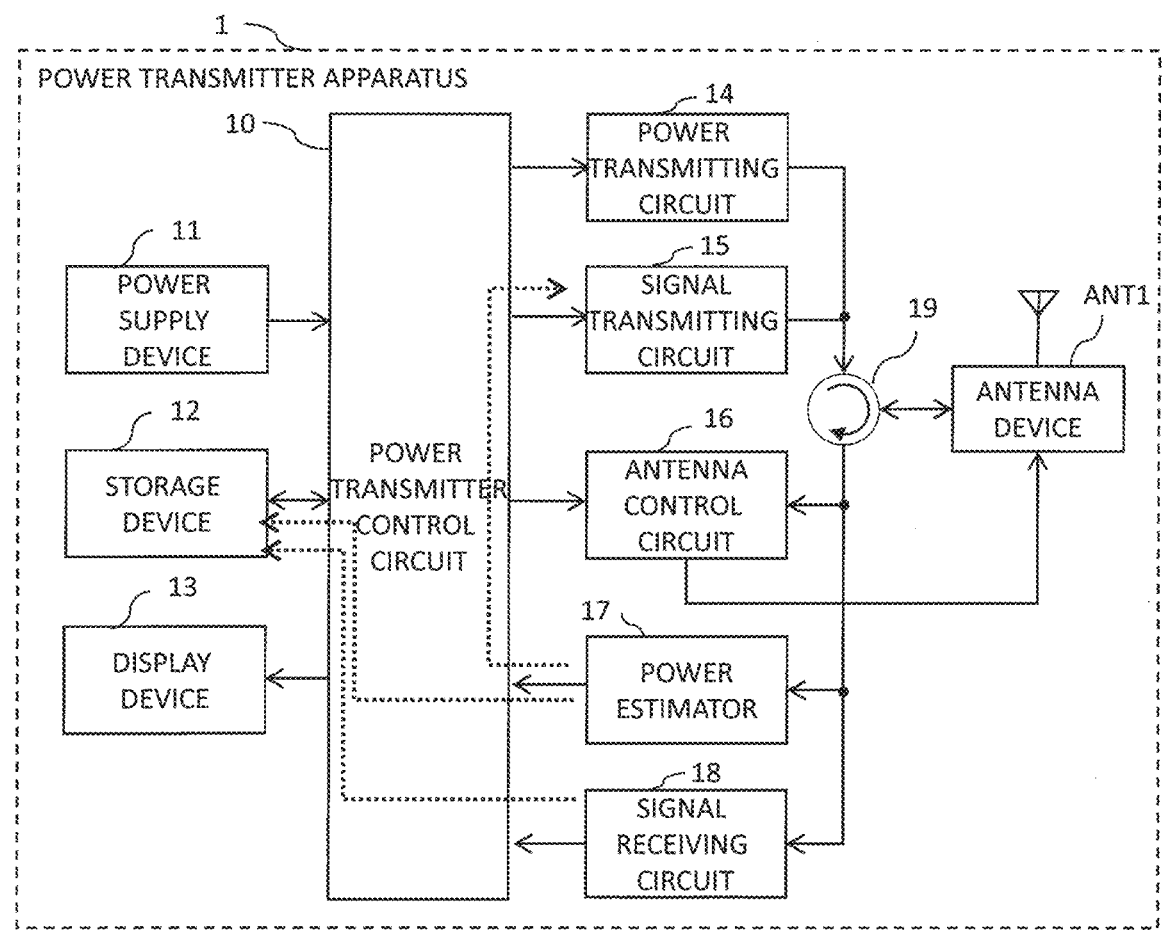
FIG. 2 is a block diagram showing a configuration of a power transmitter apparatus 1 of FIG. 1.

FIG. 2 is a block diagram showing a configuration of the power transmitter apparatus 1 of FIG. 1. The power transmitter apparatus 1 is provided with, at least, a power transmitter control circuit 10, a power transmitting circuit 14, a signal transmitting circuit 15, a power estimator 17, and a signal receiving circuit 18.

The power estimator 17 calculates a plurality of first estimated power values based on signal levels of test signals received from the power receiver apparatuses 2, each of the first estimated power values indicating estimated received power of a corresponding one of the power receiver apparatuses 2 when the power transmitter apparatus 1 transmits power to the plurality of power receiver apparatuses 2.

The signal transmitting circuit 15 transmits each of the first estimated power values to a corresponding one of the power receiver apparatuses 2.

The signal receiving circuit 18 receives a plurality of second estimated power values from the power receiver apparatuses 2, each of the second estimated power values indicating estimated received power of a corresponding one of the power receiver apparatuses 2 when other power transmitter apparatuses 1 of the wireless power transmission system transmits power to the power receiver apparatuses 2. In addition, the signal receiving circuit 18 receives the test signals for calculating the first estimated power values, from the power receiver apparatuses 2.

In the present specification, with regard to a certain power transmitter apparatus 1, the estimated power value calculated by the power transmitter apparatus 1 itself is also referred to as a "first estimated power value", and the estimated power values calculated by the other power transmitter apparatuses 1 are also referred to as "second estimated power values".

The power transmitter control circuit 10 determines pairing of the power transmitter apparatuses 1 and the power receiver apparatuses 2 for power transmission, based on a power table including the first and second estimated power values, so that the estimated received power of each of the power receiver apparatuses 2 is equal to or higher than a predetermined threshold.

The power transmitting circuit 14 transmits power to one of the power receiver apparatuses 2 corresponding to the power transmitter apparatus 1 itself, based on the determined pairing.

Figure 4:
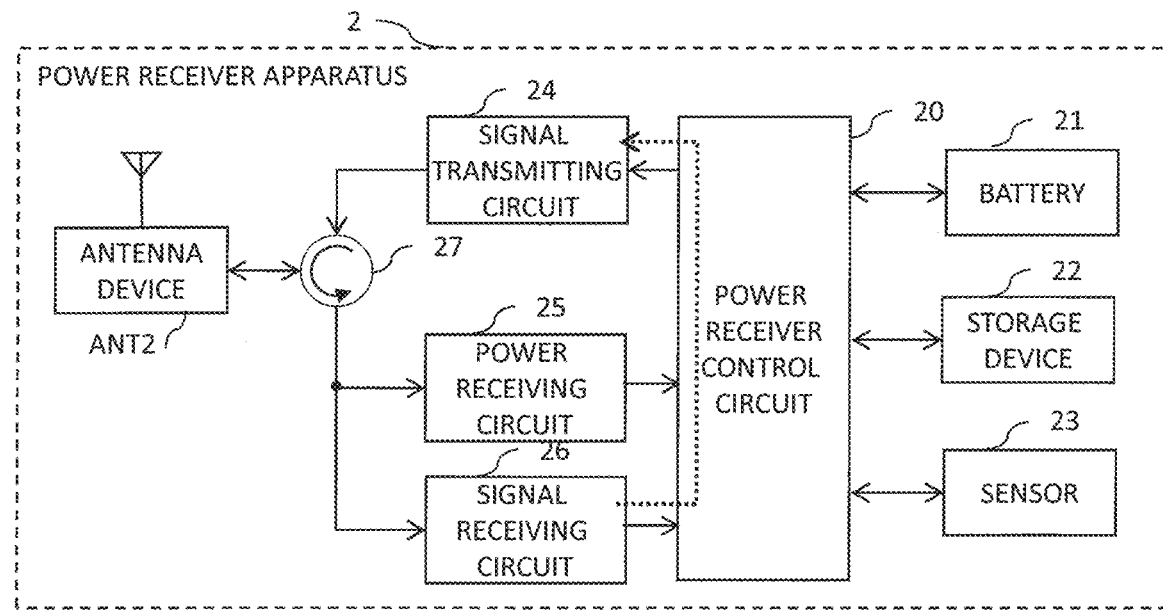
FIG. 4 is a block diagram showing a configuration of the power receiver apparatus 2 of FIG. 1.

FIG. 4 is a block diagram showing a configuration of the power receiver apparatus 2 of FIG. 1. The power receiver apparatus 2 is provided with, at least, a signal transmitting circuit 24, a power receiving circuit 25, and a signal receiving circuit 26.

The signal receiving circuit 26 receives a plurality of estimated power values from the power transmitter apparatuses 1, each of the estimated power values indicating the estimated received power of the corresponding one of the power receiver apparatuses 2 when each of the power transmitter apparatuses 1 transmits power to each of the power receiver apparatuses 2 (that is, the signal receiving circuit 26 receives the first and second estimated power values).

The signal transmitting circuit 24 transmits, to the power transmitter apparatus 1 as the source of one estimated power value, the other estimated power values received from the other power transmitter apparatuses 1, among the plurality of estimated power values received from the plurality of the power transmitter apparatuses 1. In addition, the signal transmitting circuit 24 transmits the test signal for calculating the first estimated power value, to each of the power transmitter apparatuses 1.

The power receiving circuit 25 receives power from one of the power transmitter apparatuses 1 corresponding to the power receiver apparatus 2 itself.

According to the wireless power transmission system of the embodiment, it is possible to determine the pairing of the power transmitter apparatuses 1 and the power receiver apparatuses 2 for power transmission, so that the estimated received power of each of the power receiver apparatuses 2 is equal to or higher than the predetermined threshold. In addition, according to the wireless power transmission system of the embodiment, the plurality of power transmitter apparatuses 1 can determine the pairing independently of each other, without need for communication among the plurality of power transmitter apparatuses 1, and without need for an external control apparatus to control the plurality of power transmitter apparatuses 1.

Configuration Example

In the example of FIG. 2, the power transmitter apparatus 1 is further provided with a power supply device 11, a storage device 12, a display device 13, an antenna control circuit 16, a circulator circuit 19, and an antenna device ANT1.

The power supply device 11 supplies electric power to be transmitted to the power receiver apparatuses 2.

The storage device 12 stores the power table including the plurality of estimated power values, under control of the power transmitter control circuit 10.

The display device 13 displays an error message when sufficient power cannot be transmitted from the power transmitter apparatus 1 to the power receiver apparatus 2. The display device 13 includes, for example, a light emitting diode.

The antenna device ANT1 has a variable directivity. The antenna control circuit 16 controls the directivity of the antenna device ANT1 under control of the power transmitter control circuit 10.

The circulator circuit 19 combines and separates the power and the signal transmitted to the power receiver apparatus 2 via the antenna device ANT1, and the signal received from the power receiver apparatus 2 via the antenna device ANT1.

Figure 3:
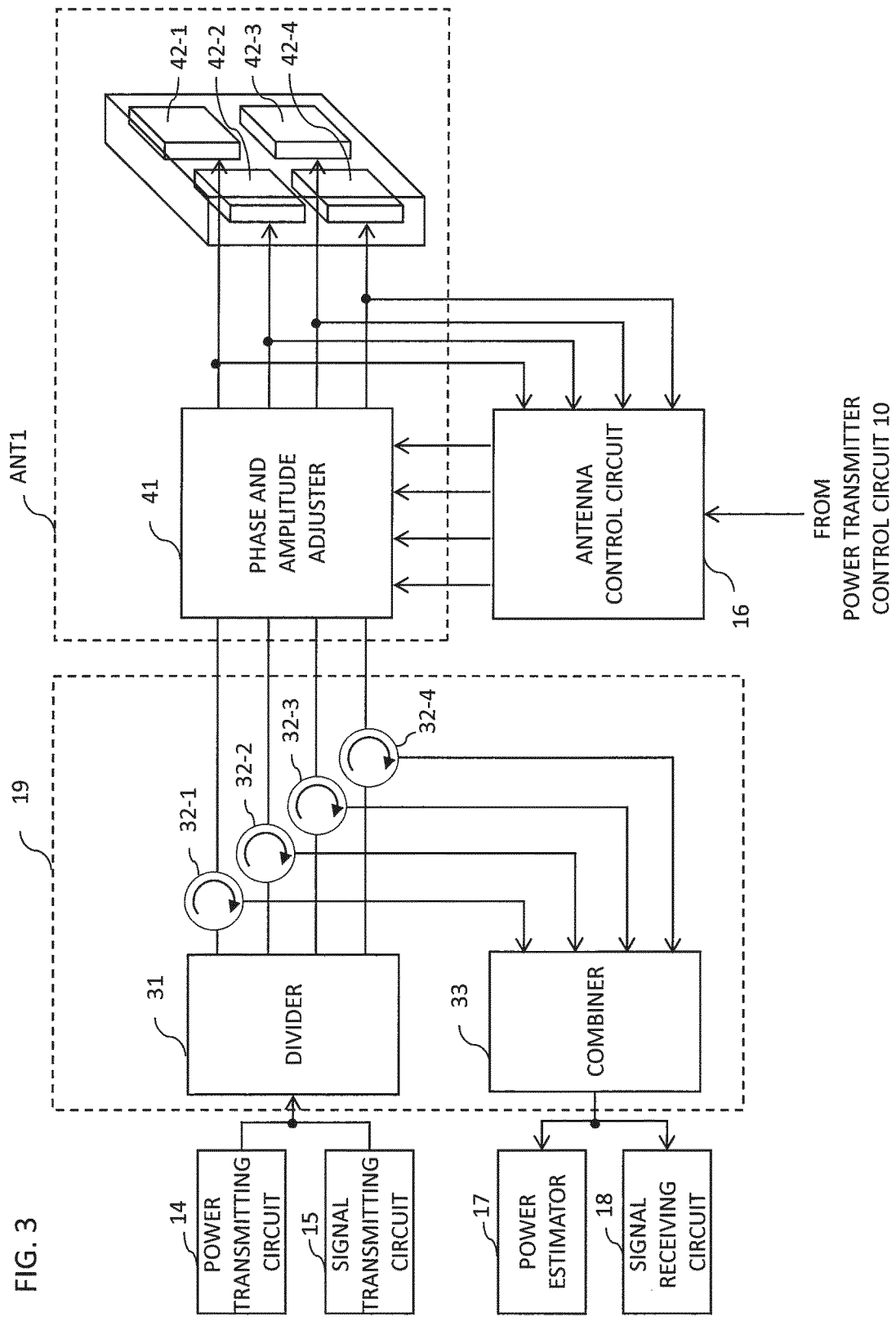
FIG. 3 is a block diagram showing a detailed configuration of a circulator circuit 19 and an antenna device ANT1 of FIG. 2.

FIG. 3 is a block diagram showing a detailed configuration of the circulator circuit 19 and the antenna device ANT1 of FIG. 2. The antenna device ANT1 may be, for example, an array antenna including a plurality of antenna elements.

The circulator circuit 19 is provided with a divider 31, circulators 32-1 to 32-4, and a combiner 33. The divider 31 divides the electric power sent from the power transmitting circuit 14 into four in accordance with the number of antenna elements. Similarly, the divider 31 divides the signal sent from the signal transmitting circuit 15 into four in accordance with the number of antenna elements. The circulators 32-1 to 32-4 send the power and signals divided by the divider 31 to the antenna device ANT1, and send the four signals sent from the antenna device ANT1 to the combiner 33. The combiner 33 combines the four signals sent from the antenna device ANT1, and sends the combined signal to the power estimator 17 and the signal receiving circuit 18.

The antenna device ANT1 is provided with a phase and amplitude adjuster 41, and antenna elements 42-1 to 42-4. The antenna elements 42-1 to 42-4 are arranged at predetermined intervals from each other. The phase and amplitude adjuster 41 adjusts phases and amplitudes of the signals transmitted or received via the antenna elements 42-1 to 42-4, under control of the antenna control circuit 16, thus controlling beam and null directions of the antenna device ANT1.

The power transmitter control circuit 10 may determine the pairing of the power transmitter apparatuses 1 and the power receiver apparatuses 2 for power transmission, so as to maximize total estimated received power of the plurality of power receiver apparatuses 2 based on the power table including the plurality of estimated power values.

The signal transmitting circuit 15 may transmit the first pairing information indicating the determined pairing, to the power receiver apparatuses 2, and the signal receiving circuit 18 may receive the second pairing information indicating the pairing determined by the other power transmitter apparatuses 1 of the wireless power transmission system, from the power receiver apparatuses 2. In this case, the power transmitter control circuit 10 may determine the pairing of the power transmitter apparatus 1 itself, so as to exclude the power receiver apparatuses 2 included in the pairing determined by the other power transmitter apparatuses 1 of the wireless power transmission system.

In the present specification, with regard to a certain power transmitter apparatus 1, the pairing information determined by the power transmitter apparatus 1 itself is also referred to as "first pairing information", and the pairing information determined by the other power transmitter apparatuses 1 is also referred to as "second pairing information".

In the example of FIG. 4, the power receiver apparatus 2 is further provided with a power receiver control circuit 20, a battery 21, a storage device 22, a sensor 23, a circulator circuit 27, and an antenna device ANT2.

The power receiver control circuit 20 controls the overall operation of the power receiver apparatus 2.

The battery 21 stores the electric power transmitted from the power transmitter apparatus 1.

The storage device 22 stores the plurality of estimated power values received from the plurality of the power transmitter apparatuses 1, under control of the power receiver control circuit 20.

The sensor 23 measures a predetermined physical quantity.

The antenna device ANT2 has a predetermined directivity or non-directivity.

The circulator circuit 27 combines and separates the power and the signal transmitted from the power transmitter apparatus 1 via the antenna device ANT2, and the signal transmitted to the power transmitter apparatus 1 via the antenna device ANT2.

The signal transmitting circuit 24 transmits the physical quantity measured by the sensor 23, to the power transmitter apparatus 1.

Figure 5:
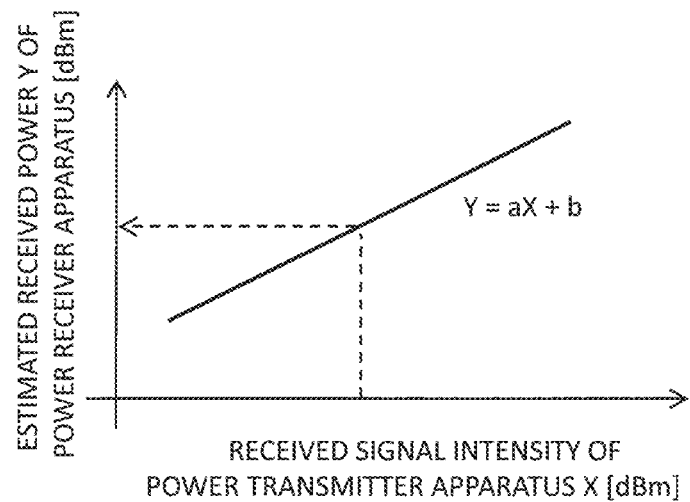
FIG. 5 is a diagram schematically illustrating calculation of an estimated power value by a power estimator 17 of FIG. 2.

FIG. 5 is a diagram schematically illustrating calculation of the estimated power value by the power estimator 17 of FIG. 2. Ii is considered that in a certain radio wave propagation environment, the signal level of the power transmitter apparatus 1 and the estimated received power of the power receiver apparatus 2 vary substantially in the same manner. Therefore, the estimated power value is calculated by transmitting a test signal from the power receiver apparatus 2 to the power transmitter apparatus 1, and measuring the signal level of the test signal, for example, the received signal strength. The power estimator 17 calculates each of the first estimated power values based on the signal level of the test signal received from each of the power receiver apparatuses 2.

Operation Example

Figure 6:
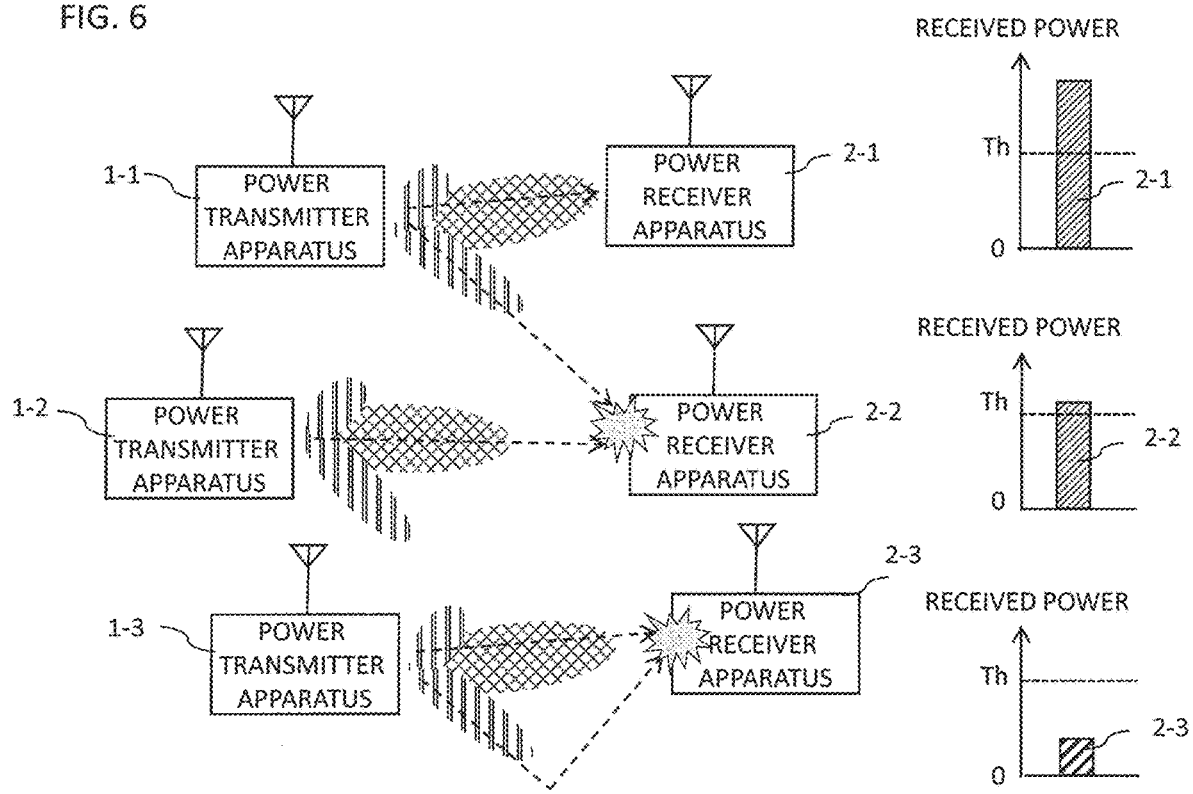
FIG. 6 is a diagram showing a case where interference occurs in the wireless power transmission system of FIG. 1.

FIG. 6 is a diagram showing a case where interference occurs in the wireless power transmission system of FIG. 1. As described above, interference occurs due to reflection or diffraction of radio waves, depending on the positional relationship between the power transmitter apparatus 1 and the power receiver apparatus 2, or depending on the surrounding environment. In the example of FIG. 6, the power available to the power receiver apparatuses 2-2 and 2-3 is lower than the power available to the power receiver apparatus 2-1. In addition, the power available to the power receiver apparatus 2-3 is lower than a threshold Th of the lower limit power for operating the power receiver apparatus 2. Therefore, it is required to determine the pairing of the power transmitter apparatuses 1 and the power receiver apparatuses 2 so as to transmit sufficient power to all the power receiver apparatuses 2.

Figure 7:
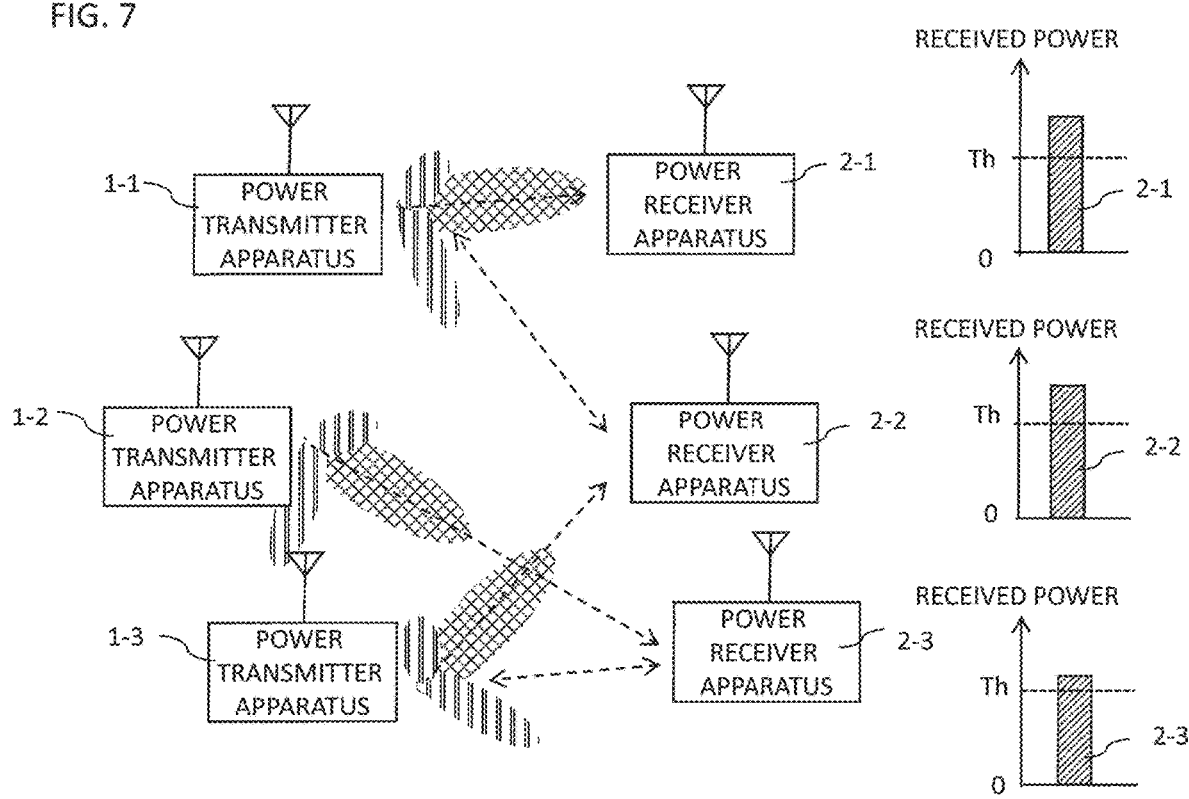
FIG. 7 is a diagram showing a case where interference does not occur in the wireless power transmission system of FIG. 1.

FIG. 7 is a diagram showing a case where interference does not occur in the wireless power transmission system of FIG. 1. In the example of FIG. 7, the pairing of the power transmitter apparatuses 1 and the power receiver apparatuses 2 is determined so that the power transmitter apparatus 1-1 transmits power to the power receiver apparatus 2-1, the power transmitter apparatus 1-2 transmits power to the power receiver apparatus 2-3, and the power transmitter apparatus 1-3 transmits power to the power receiver apparatus 2-2. Furthermore, in the example of FIG. 7, radiation patterns of the antenna devices are controlled so that the null of the antenna device of the power transmitter apparatus 1-1 is directed to the power receiver apparatus 2-2, and the null of the antenna device of the power transmitter apparatus 1-3 is directed to the power receiver apparatus 2-3. Thus, it is possible to determine the pairing of the power transmitter apparatuses 1 and the power receiver apparatuses 2 for power transmission, so as to transmit sufficient power exceeding the threshold Th to all the power receiver apparatuses 2.

Next, an exemplary operation of the wireless power transmission system of FIG. 1 will be described with reference to FIGS. 8 to 26.

Figure 8:
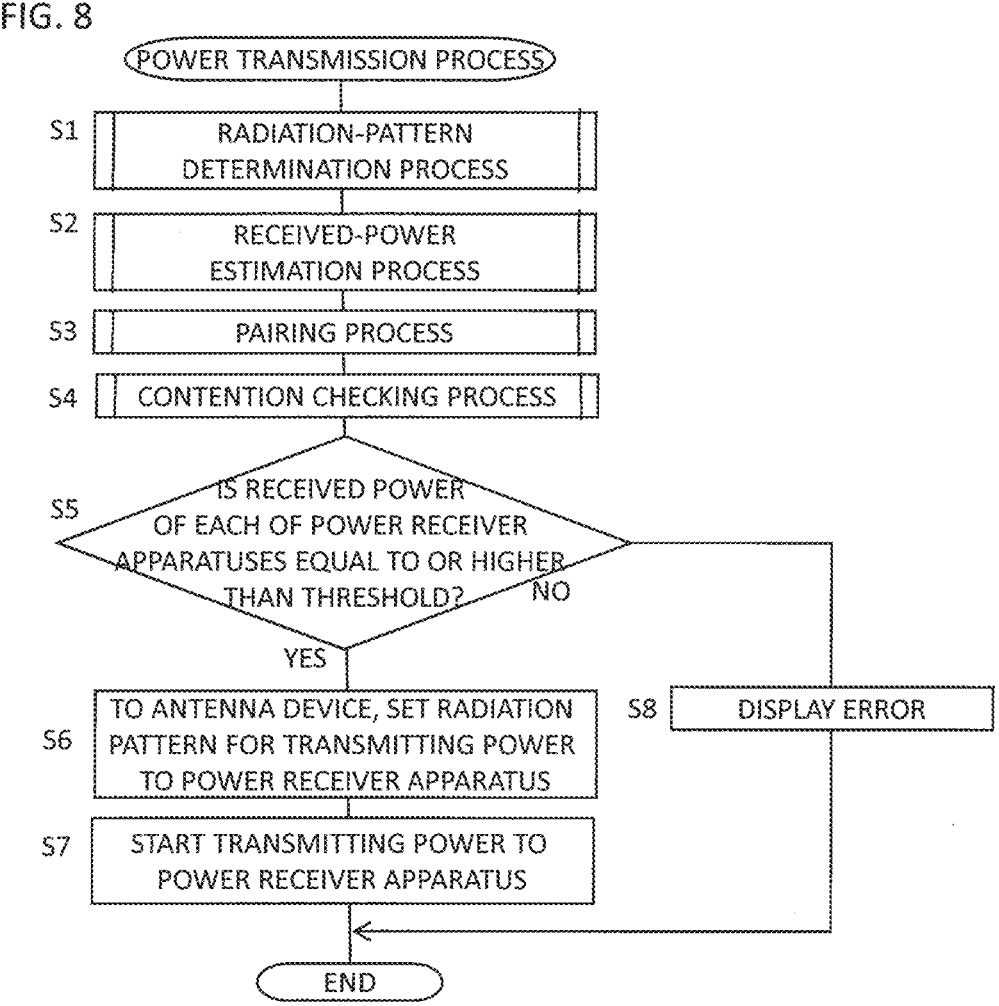
FIG. 8 is a flowchart showing power transmission process executed by a power transmitter control circuit 10 of FIG. 2.

FIG. 8 is a flowchart showing power transmission process executed by the power transmitter control circuit 10 of FIG. 2.

In step S1, the power transmitter control circuit 10 executes radiation-pattern determination process. In the radiation-pattern determination process, a plurality of radiation patterns are determined for transmitting power and signals from one power transmitter apparatus 1 executing the power transmission process of FIG. 8, to the power receiver apparatuses 2-1 to 2-3.

In step S2, the power transmitter control circuit 10 executes received-power estimation process. In the received-power estimation process, a plurality of estimated power values are calculated, each of the estimated power values indicating the estimated received power of a corresponding one of the power receiver apparatus 2-1 to 2-3 when the one power transmitter apparatus 1 executing the power transmission process of FIG. 8 transmits power to the power receiver apparatuses 2-1 to 2-3.

In step S3, the power transmitter control circuit 10 executes pairing process. In the pairing process, the pairing is determined between the one power transmitter apparatus 1 executing the power transmission process of FIG. 8, and the power receiver apparatus 2 to which the one power transmitter apparatus 1 transmits power.

In step S4, the power transmitter control circuit 10 executes contention checking process. In the contention checking process, it is determined whether or not contention of the power receiver apparatuses 2 occurs between the pairing determined by the one power transmitter apparatus 1 executing the power transmission process of FIG. 8, and the pairing determined by the other power transmitter apparatuses 1, and if the contention occurs, the pairing is redetermined.

In step S5, the power transmitter control circuit 10 determines whether or not the received power of each of the power receiver apparatuses 2 is equal to or higher than the threshold, and if YES, the process proceeds to step S6, and if NO, the process proceeds to step S8. The threshold is set to, for example, a value larger than the lower limit power for operating the power receiver apparatus 2.

In step S6, the power transmitter control circuit 10 sets, to the antenna device ANT1, the radiation pattern for transmitting power to the power receiver apparatus 2 according to the pairing determined in steps S3 to S4. In step S7, the power transmitter control circuit 10 starts transmitting power to the power receiver apparatus 2 via the antenna device ANT1.

In step S8, the power transmitter control circuit 10 displays an error message on the display device 13.

Figure 9:
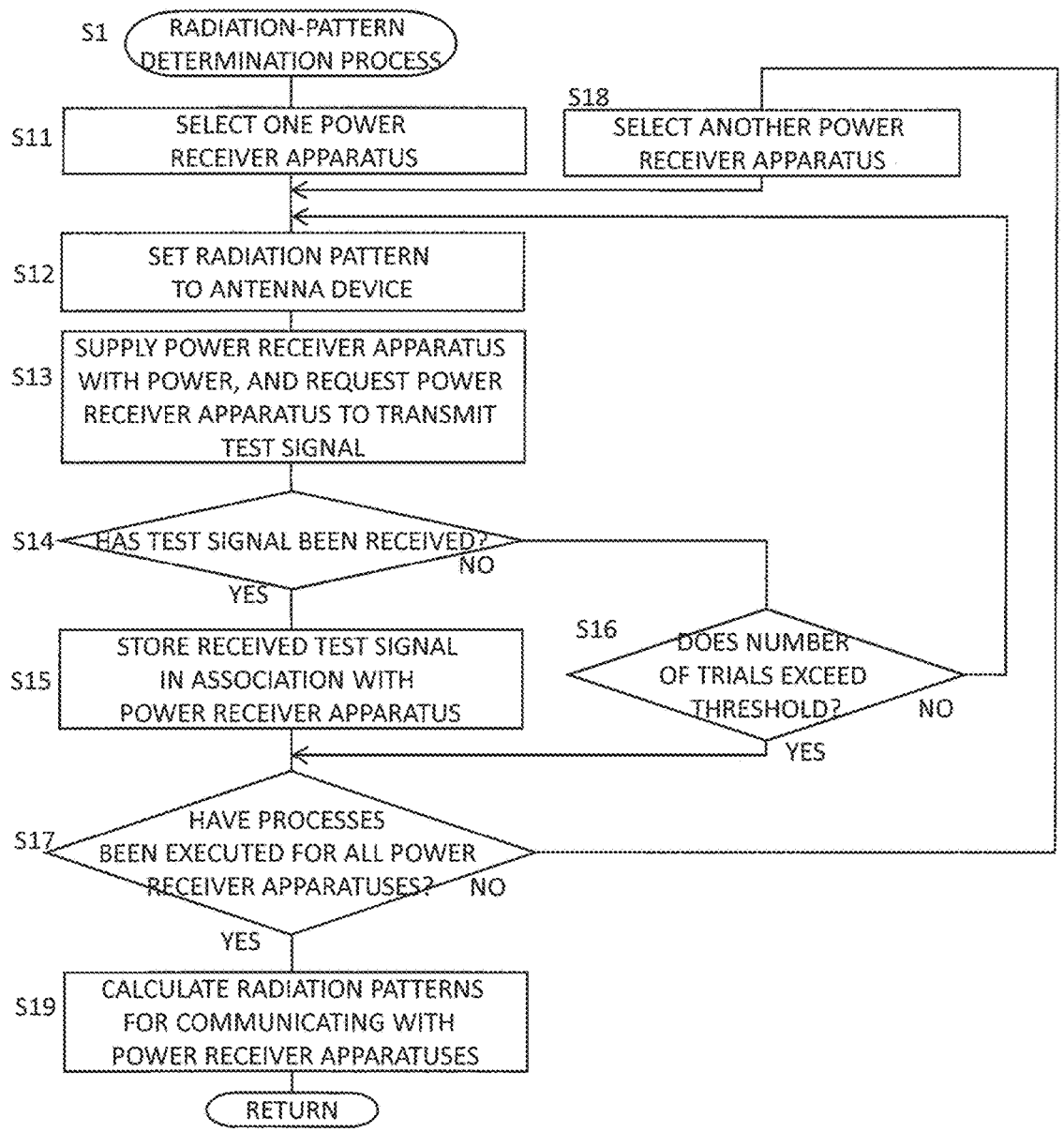
FIG. 9 is a flowchart showing a subroutine of radiation-pattern determination process of step S1 in FIG. 8.

FIG. 9 is a flowchart showing a subroutine of the radiation-pattern determination process of step S1 in FIG. 8.

In step S11, the power transmitter control circuit 10 selects one power receiver apparatus 2.

In step S12, the power transmitter control circuit 10 sets a radiation pattern to the antenna device ANT1. In step S13, the power transmitter control circuit 10 supplies the power receiver apparatus 2 with power for transmitting a test signal from the power receiver apparatus 2 to the power transmitter apparatus 1 executing the power transmission process of FIG. 8. Furthermore, in step S13, the power transmitter control circuit 10 requests the power receiver apparatus 2 to transmit a test signal. In step S14, the power transmitter control circuit 10 determines whether or not the test signal has been received from the power receiver apparatus 2, and if YES, the process proceeds to step S15, and if NO, the process proceeds to step S16. In step S15, the power transmitter control circuit 10 stores the received test signal inside the signal receiving circuit 18 or in the storage device 12, in association with the power receiver apparatus 2. A number or other identifier may be assigned to each of the power receiver apparatuses 2 in order to associate the received test signal with the power receiver apparatus 2.

In step S16, the power transmitter control circuit 10 determines whether or not the number of trials to receive the test signal from the power receiver apparatus 2 exceeds a threshold, and if YES, the process proceeds to step S17, and if NO, the process returns to step S12. When the process returns from step S16 to step S12, another radiation pattern is set to the antenna device ANT1, and the process is repeated.

In step S17, the power transmitter control circuit 10 determines whether or not the processes of steps S12 to S16 have been executed for all the power receiver apparatuses 2, and if YES, the process proceeds to step S19, and if NO, the process proceeds to step S18. In step S18, the power transmitter control circuit 10 selects another power receiver apparatus 2, and repeats the processes.

In step S19, the power transmitter control circuit 10 calculates a plurality of radiation patterns each for communicating with a corresponding one of the power receiver apparatuses 2, based on the stored test signals. In this case, each of the radiation patterns may be calculated, for example, so as to have a beam towards a selected power receiver apparatus 2, and nulls towards the other power receiver apparatuses 2.

Figure 13:
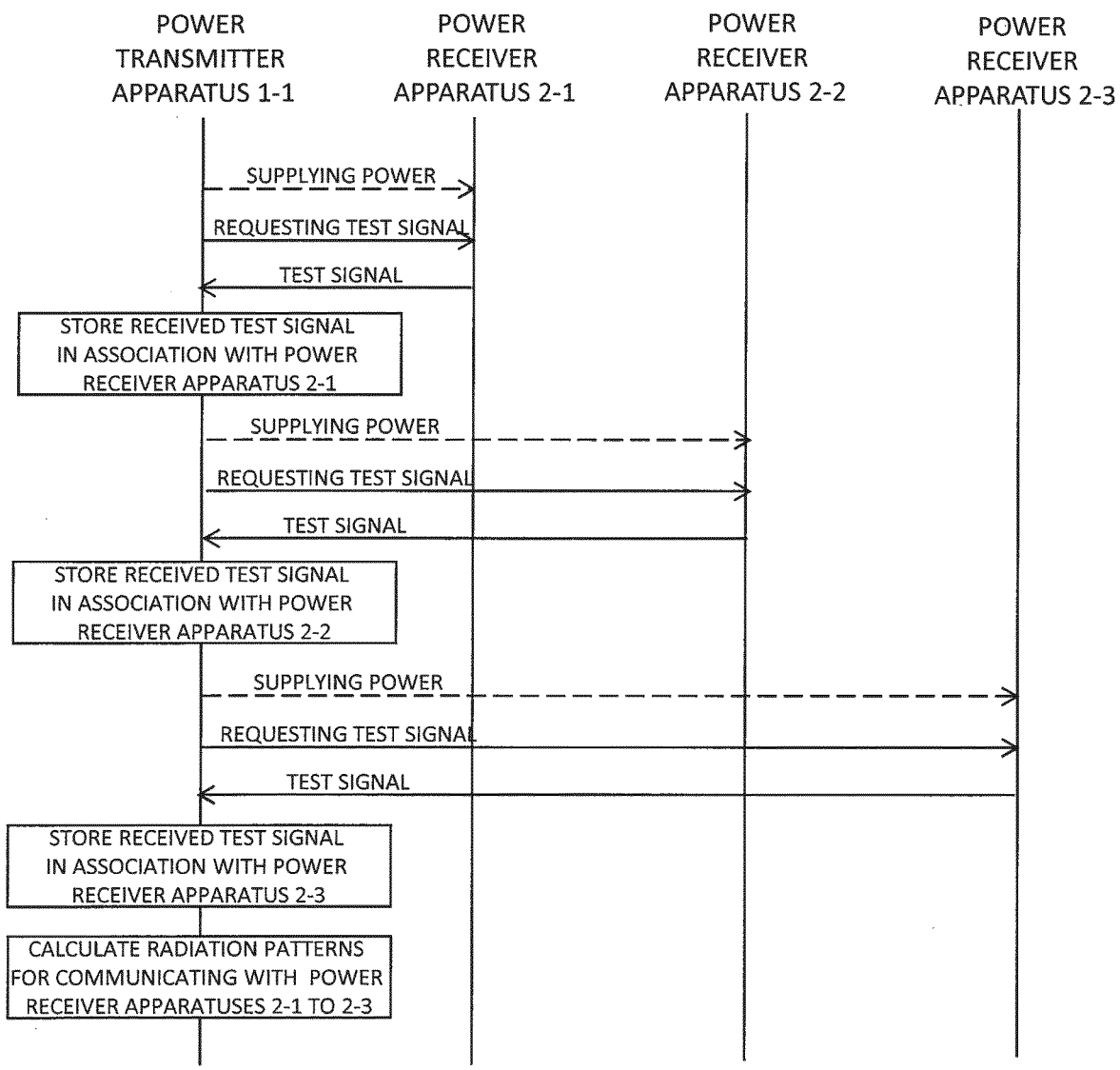
FIG. 13 is a sequence diagram showing schematic operations of the power transmitter apparatus 1-1 and the power receiver apparatuses 2-1 to 2-3 in the radiation-pattern determination process of step S1 in FIG. 8.

FIG. 13 is a sequence diagram showing schematic operations of the power transmitter apparatus 1-1 and the power receiver apparatuses 2-1 to 2-3 in the radiation-pattern determination process of step S1 in FIG. 8. The power transmitter apparatus 1-1 executes the radiation-pattern determination process to determine a plurality of radiation patterns each for communicating with a corresponding one of the power receiver apparatuses 2-1 to 2-3.

The other power transmitter apparatuses 1-2 and 1-3 also execute the radiation-pattern determination process to determine a plurality of radiation patterns each for communicating with a corresponding one of the power receiver apparatuses 2-1 to 2-3, in a manner similar to that of the power transmitter apparatus 1-1.

Figure 10:
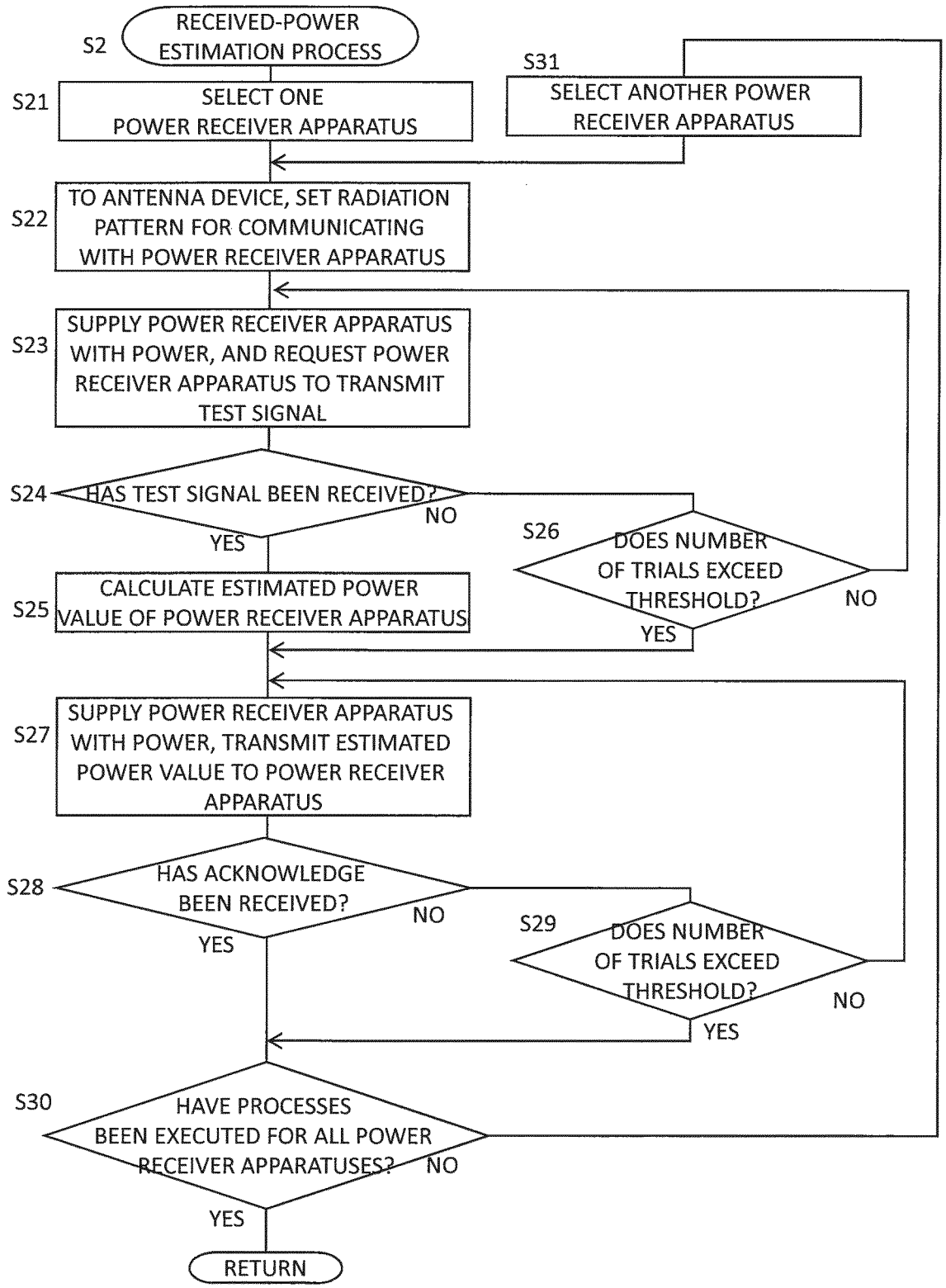
FIG. 10 is a flowchart showing a subroutine of received-power estimation process of step S2 in FIG. 8.

FIG. 10 is a flowchart showing a subroutine of the received-power estimation process of step S2 in FIG. 8.

In step S21, the power transmitter control circuit 10 selects one power receiver apparatus 2.

In step S22, the power transmitter control circuit 10 sets the radiation pattern for communicating with the power receiver apparatus 2, to the antenna device ANT1. In step S23, the power transmitter control circuit 10 supplies the power receiver apparatus 2 with power for transmitting a test signal from the power receiver apparatus 2 to the power transmitter apparatus 1 executing the power transmission process of FIG. 8. Furthermore, in step S22, the power transmitter control circuit 10 requests the power receiver apparatus 2 to transmit a test signal. In step S24, the power transmitter control circuit 10 determines whether or not the test signal has been received from the power receiver apparatus 2, and if YES, the process proceeds to step S25, and if NO, the process proceeds to step S26. In step S25, the power transmitter control circuit 10 calculates the estimated power value of the power receiver apparatus 2 based on the received test signal, the estimated power value indicating the estimated received power of the power receiver apparatus 2 when the power transmitter apparatus 1 transmits power to the power receiver apparatus 2.

In step S26, the power transmitter control circuit 10 determines whether or not the number of trials to receive the test signal from the power receiver apparatus 2 exceeds a threshold, and if YES, the process proceeds to step S27, and if NO, the process returns to step S23.

In step S27, the power transmitter control circuit 10 supplies the power receiver apparatus 2 with power for receiving and storing the estimated power value. Furthermore, in step S27, the power transmitter control circuit 10 transmits the estimated power value to the power receiver apparatus 2. In step S28, the power transmitter control circuit 10 determines whether or not an acknowledge signal has been received from the power receiver apparatus 2, and if YES, the process proceeds to step S30, and if NO, the process proceeds to step S29. In step S29, the power transmitter control circuit 10 determines whether or not the number of trials to receive the acknowledge signal from the power receiver apparatus 2 exceeds a threshold, and if YES, the process proceeds to step S30, and if NO, the process returns to step S27. In step S30, the power transmitter control circuit 10 determines whether or not the processes of steps S22 to S29 have been executed for all the power receiver apparatuses 2, and if YES, the process proceeds to step S3 in FIG. 8, and if NO, the process proceeds to step S31.

In step S31, the power transmitter control circuit 10 selects another power receiver apparatus 2, and repeats the processes.

Figure 14:
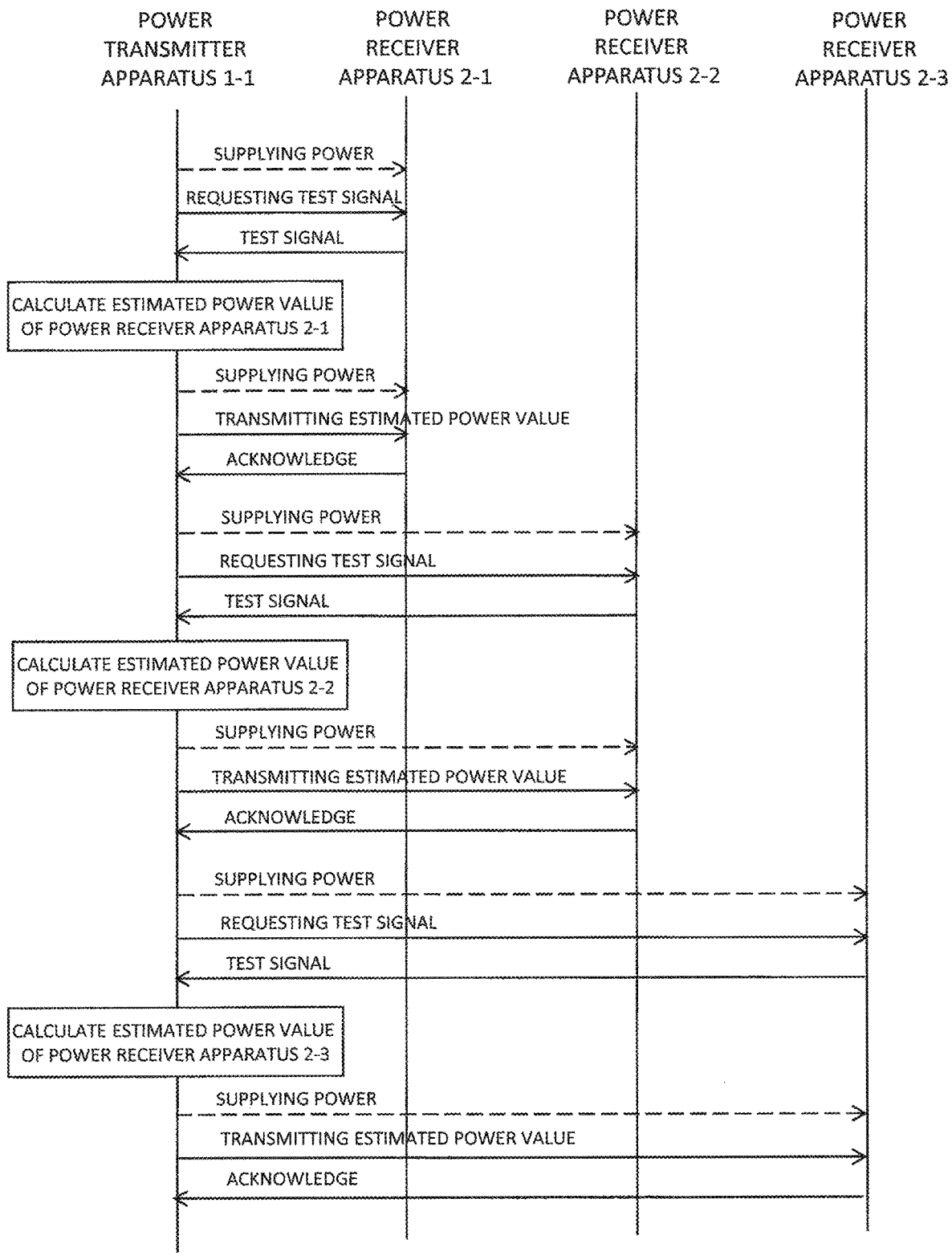
FIG. 14 is a sequence diagram showing schematic operations of the power transmitter apparatus 1-1 and the power receiver apparatuses 2-1 to 2-3 in the received-power estimation process of step S2 in FIG. 8.

FIG. 14 is a sequence diagram showing schematic operations of the power transmitter apparatus 1-1 and the power receiver apparatuses 2-1 to 2-3 in the received-power estimation process of step S2 in FIG. 8. The power transmitter apparatus 1-1 executes the received-power estimation process to calculate the estimated power values of the power receiver apparatuses 2-1 to 2-3, and transmit the calculated estimated power values to the power receiver apparatuses 2-1 to 2-3, respectively.

The other power transmitter apparatuses 1-2 and 1-3 also execute the received-power estimation process to calculate the estimated power values of the power receiver apparatuses 2-1 to 2-3, and transmit the calculated estimated power values to the power receiver apparatuses 2-1 to 2-3, respectively, in a manner similar to that of the power transmitter apparatus 1-1.

FIG. 17 is a diagram showing an exemplary power table of the power transmitter apparatus 1-1 generated by the power transmitter apparatus 1-1 of FIG. 1 performing the received-power estimation process of step S2 in FIG. 8. FIG. 18 is a diagram showing an exemplary power table of the power transmitter apparatus 1-2 generated by the power transmitter apparatus 1-2 of FIG. 1 performing the received-power estimation process of step S2 in FIG. 8. FIG. 19 is a diagram showing an exemplary power table of the power transmitter apparatus 1-3 generated by the power transmitter apparatus 1-3 of FIG. 1 performing the received-power estimation process of step S2 in FIG. 8. In FIGS. 17 to 26, the unit is dBm.

FIG. 20 is a diagram showing an exemplary power table of the power receiver apparatus 2-1 generated by the power transmitter apparatuses 1-1 to 1-3 of FIG. 1 performing the received-power estimation process of step S2 in FIG. 8. FIG. 21 is a diagram showing an exemplary power table of the power receiver apparatus 2-2 generated by the power transmitter apparatuses 1-1 to 1-3 of FIG. 1 performing the received-power estimation process of step S2 in FIG. 8. FIG. 22 is a diagram showing an exemplary power table of the power receiver apparatus 2-3 generated by the power transmitter apparatuses 1-1 to 1-3 of FIG. 1 performing the received-power estimation process of step S2 in FIG. 8.

Figure 11:
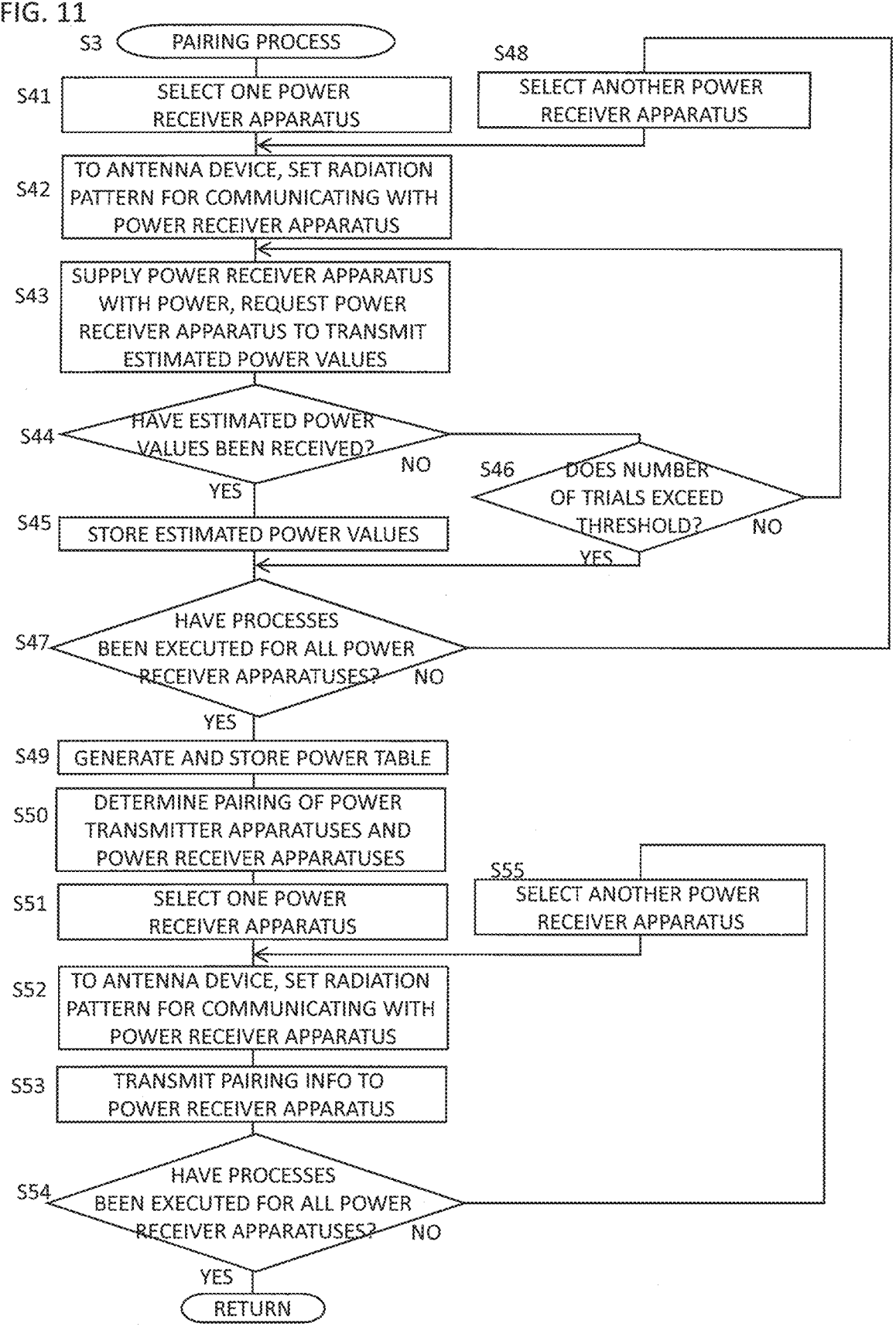
FIG. 11 is a flowchart showing a subroutine of pairing process of step S3 in FIG. 8.

FIG. 11 is a flowchart showing a subroutine of the pairing process of step S3 in FIG. 8.

In step S41, the power transmitter control circuit 10 selects one power receiver apparatus 2.

In step S42, the power transmitter control circuit 10 sets the radiation pattern for communicating with the power receiver apparatus 2, to the antenna device ANT1. In step S43, the power transmitter control circuit 10 supplies the power receiver apparatus 2 with power for transmitting the estimated power values from the power receiver apparatus 2 to the power transmitter apparatus 1 executing the power transmission process of FIG. 8. Furthermore, in step S43, the power transmitter control circuit 10 requests the power receiver apparatus 2 to transmit the estimated power values. In step S44, the power transmitter control circuit 10 determines whether or not the estimated power values have been received from the power receiver apparatus 2, and if YES, the process proceeds to step S45, and if NO, the process proceeds to step S46. In step S45, the power transmitter control circuit 10 stores the estimated power values in the storage device 12. In step S46, the power transmitter control circuit 10 determines whether or not the number of trials to receive the estimated power values from the power receiver apparatus 2 exceeds a threshold, and if YES, the process proceeds to step S47, and if NO, the process returns to step S43. In step S47, the power transmitter control circuit 10 determines whether or not the processes of steps S42 to S46 have been executed for all the power receiver apparatuses 2, and if YES, the process proceeds to step S49, and if NO, the process proceeds to step S48.

In step S48, the power transmitter control circuit 10 selects another power receiver apparatus 2.

In step S49, the power transmitter control circuit 10 generates a power table from the estimated power values calculated by the power transmitter apparatus 1 executing the power transmission process, and the estimated power values calculated by the other power transmitter apparatuses 1, and stores the power table in the storage device 12. In step S50, the power transmitter control circuit 10 determines the pairing of the power transmitter apparatuses 1 and the power receiver apparatuses 2 based on the power table. In this case, the power transmitter control circuit 10 determines the pairing of the power transmitter apparatuses 1 and the power receiver apparatuses 2 for power transmission, so that the estimated received power of each of the power receiver apparatuses 2 is equal to or higher than the predetermined threshold. Further, the power transmitter control circuit 10 may determine the pairing of the power transmitter apparatuses 1 and the power receiver apparatuses 2 for power transmission, so as to maximize the total of the estimated power values of the plurality of power receiver apparatuses 2.

In step S51, the power transmitter control circuit 10 selects one power receiver apparatus 2.

In step S52, the power transmitter control circuit 10 sets the radiation pattern for communicating with the power receiver apparatus 2, to the antenna device ANT1. In step S53, the power transmitter control circuit 10 transmits the pairing information indicating the pairing determined in step S50, to the power receiver apparatus 2. In step S54, the power transmitter control circuit 10 determines whether or not the processes of steps S52 to S53 have been executed for all the power receiver apparatuses 2, and if YES, the process proceeds to step S4 in FIG. 8, and if NO, the process proceeds to step S55.

In step S55, the power transmitter control circuit 10 selects another power receiver apparatus 2, and repeats the processes.

Each of the power receiver apparatus 2 stores the pairing information received from the power transmitter apparatus 1, in the storage device 22. For example, the power receiver apparatuses 2 identify each of the power receiver apparatus 2 to which each of the power transmitter apparatuses 1 is determined to transmit power, in the power tables of the power receiver apparatuses 2 shown in FIGS. 20 to 22.

Figure 15:
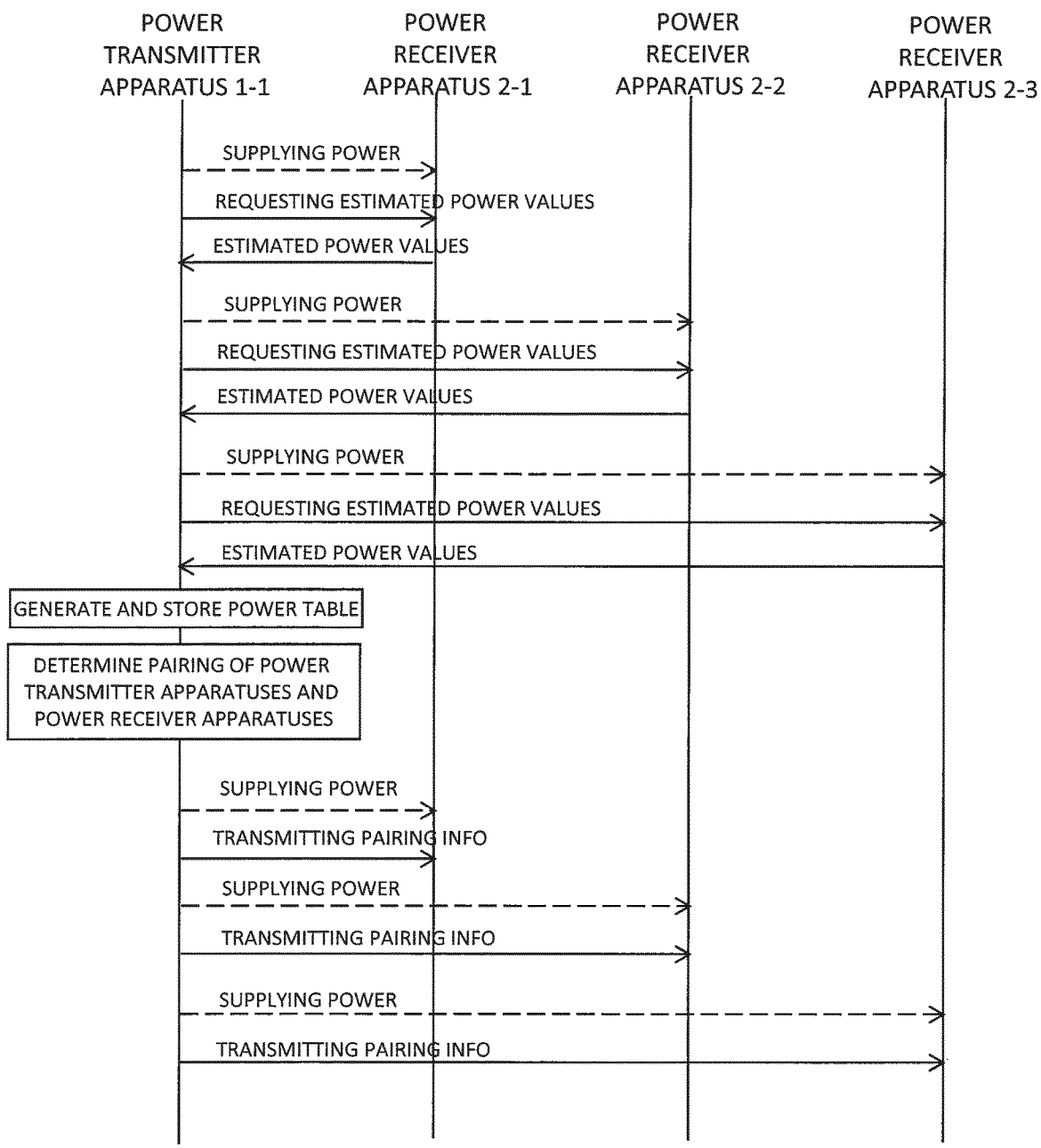
FIG. 15 is a sequence diagram showing schematic operations of the power transmitter apparatus 1-1 and the power receiver apparatuses 2-1 to 2-3 in the pairing process of step S3 in FIG. 8.

FIG. 15 is a sequence diagram showing schematic operations of the power transmitter apparatus 1-1 and the power receiver apparatuses 2-1 to 2-3 in the pairing process of step S3 in FIG. 8. The power transmitter apparatus 1-1 executes the pairing process to generate the power table including the estimated power values of the power receiver apparatuses 2, and determine the pairing of the power transmitter apparatuses 1 and the power receiver apparatuses 2 based on the power table.

The other power transmitter apparatuses 1-2 and 1-3 also execute the pairing process generate power tables each including the estimated power values of the power receiver apparatuses 2, and determine the pairing of the power transmitter apparatuses 1 and the power receiver apparatuses 2 based on the power tables, in a manner similar to that of the power transmitter apparatus 1-1.

FIG. 23 is a diagram showing an exemplary power table of the power transmitter apparatuses 1-1 to 1-3 generated by the power transmitter apparatuses 1-1 to 1-3 of FIG. 1 performing the pairing process of step S3 in FIG. 8. The power transmitter apparatus 1-1 generates the power table shown in FIG. 23 by receiving the estimated power values calculated by the power transmitter apparatuses 1-2 and 1-3, from the power receiver apparatuses 2-1 to 2-3. Similarly, each of the power transmitter apparatuses 1-2 and 1-3 generates the same power table of FIG. 23 as that of the power transmitter apparatus 1-1, by receiving the estimated power values calculated by the other power transmitter apparatus 1 from the power receiver apparatuses 2-1 to 2-3. Since the power transmitter apparatuses 1-1 to 1-3 generate the same power table, the power transmitter apparatuses 1-1 to 1-3 can determine the same pairing of the power transmitter apparatuses 1 and the power receiver apparatuses 2 based on this power table. In the example of FIG. 23, the pairing of the power transmitter apparatuses 1 and the power receiver apparatuses 2 is determined so that the power transmitter apparatus 1-1 transmits power to the power receiver apparatus 2-2, the power transmitter apparatus 1-2 transmits power to the power receiver apparatus 2-1, and the power transmitter apparatus 1-3 transmits power to the power receiver apparatus 2-3.

FIG. 24 is a diagram showing an exemplary power table of the power transmitter apparatus 1-1 generated when the power transmitter apparatus 1-1 of FIG. 1 cannot communicate with the power receiver apparatus 2-3. FIG. 25 is a diagram showing an exemplary power table of the power transmitter apparatus 1-2 generated when the power transmitter apparatus 1-2 of FIG. 1 cannot communicate with the power receiver apparatus 2-2. FIG. 26 is a diagram showing an exemplary power table of the power transmitter apparatus 1-3 generated when the power transmitter apparatus 1-3 of FIG. 1 cannot communicate with the power receiver apparatus 2-1. When a communication failure occurs between any one of the power transmitter apparatuses 1 and any one of the power receiver apparatuses 2, the power transmitter apparatus 1 may fail to calculate estimated power values of a certain power receiver apparatus 2, and may fail to obtain the estimated power values calculated by the other power transmitter apparatuses 1. In this case, the power transmitter apparatuses 1-1 to 1-3 cannot generate the same power table, and therefore, cannot determine the same pairing. As a result, contention of the power receiver apparatuses 2 may occur in the pairings determined by different power transmitter apparatuses 1. In the example of FIG. 25, the power transmitter apparatus 1-2 cannot receive the estimated power values from the power receiver apparatus 2. As a result, it is not possible to determine to which of the power receiver apparatuses 2-1 to 2-3 the power transmitter apparatus 1-2 should transmit power in order to avoid contention of the power receiver apparatuses 2 in pairing.

In order to avoid such contention of the power receiver apparatuses 2, the power transmitter control circuit 10 executes the contention checking process of step S4 in FIG. 8.

Figure 12:
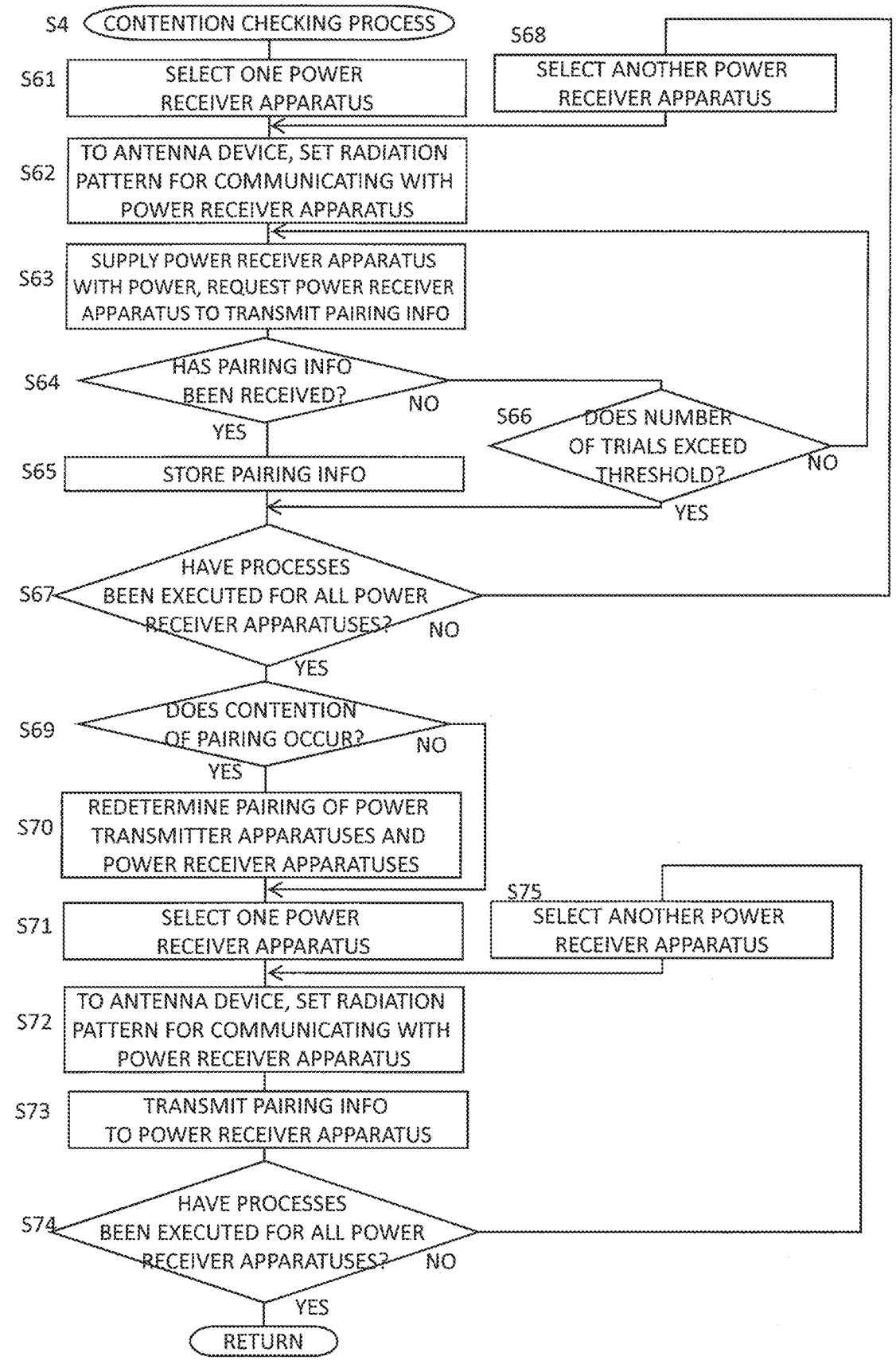
FIG. 12 is a flowchart showing a subroutine of contention checking process of step S4 in FIG. 8.

FIG. 12 is a flowchart showing a subroutine of the contention checking process of step S4 in FIG. 8.

In step S61, the power transmitter control circuit 10 selects one power receiver apparatus 2. In step S62, the power transmitter control circuit 10 sets the radiation pattern for communicating with the power receiver apparatus 2, to the antenna device ANT1. In step S63, the power transmitter control circuit 10 supplies the power receiver apparatus 2 with power for transmitting the pairing information from the power receiver apparatus 2 to the power transmitter apparatus 1 executing the power transmission process of FIG. 8. Furthermore, in step S63, the power transmitter control circuit 10 requests the power receiver apparatus 2 to transmit the pairing information. In step S64, the power transmitter control circuit 10 determines whether or not pairing information has been received from the power receiver apparatus 2, and if YES, the process proceeds to step S65, and if NO, the process proceeds to step S66. In step S65, the power transmitter control circuit 10 stores the pairing information in the storage device 12. In step S66, the power transmitter control circuit 10 determines whether or not the number of trials to receive the pairing information from the power receiver apparatus 2 exceeds a threshold, and if YES, the process proceeds to step S67, and if NO, the process returns to step S63. In step S67, the power transmitter control circuit 10 determines whether or not the processes of steps S62 to S66 have been executed for all the power receiver apparatuses 2, and if YES, the process proceeds to step S69, and if NO, the process proceeds to step S68.

In step S68, the power transmitter control circuit 10 selects another power receiver apparatus 2.

In step S69, the power transmitter control circuit 10 determines whether contention of the power receiver apparatuses 2 occurs between the pairing determined by a power transmitter apparatus 1 executing the power transmission process, and the pairing determined by the other power transmitter apparatuses 1, and if YES, the process proceeds to step S70, and if NO, the process proceeds to step S71. In step S70, the power transmitter control circuit 10 redetermines the pairing of the power transmitter apparatuses 1 and the power receiver apparatuses 2 so that contention of the power receiver apparatuses 2 does not occur.

In step S71, the power transmitter control circuit 10 selects one power receiver apparatus 2.

In step S72, the power transmitter control circuit 10 sets the radiation pattern for communicating with the power receiver apparatus 2, to the antenna device ANT1. In step S73, the power transmitter control circuit 10 transmits the pairing information indicating the pairing redetermined in step S70, to the power receiver apparatus 2. In step S74, the power transmitter control circuit 10 determines whether or not the processes of steps S72 to S73 have been executed for all the power receiver apparatuses 2, and if YES, the process proceeds to step S5 in FIG. 8, and if NO, the process proceeds to step S75.

In step S75, the power transmitter control circuit 10 selects another power receiver apparatus 2, and repeats the processes.

Figure 16:
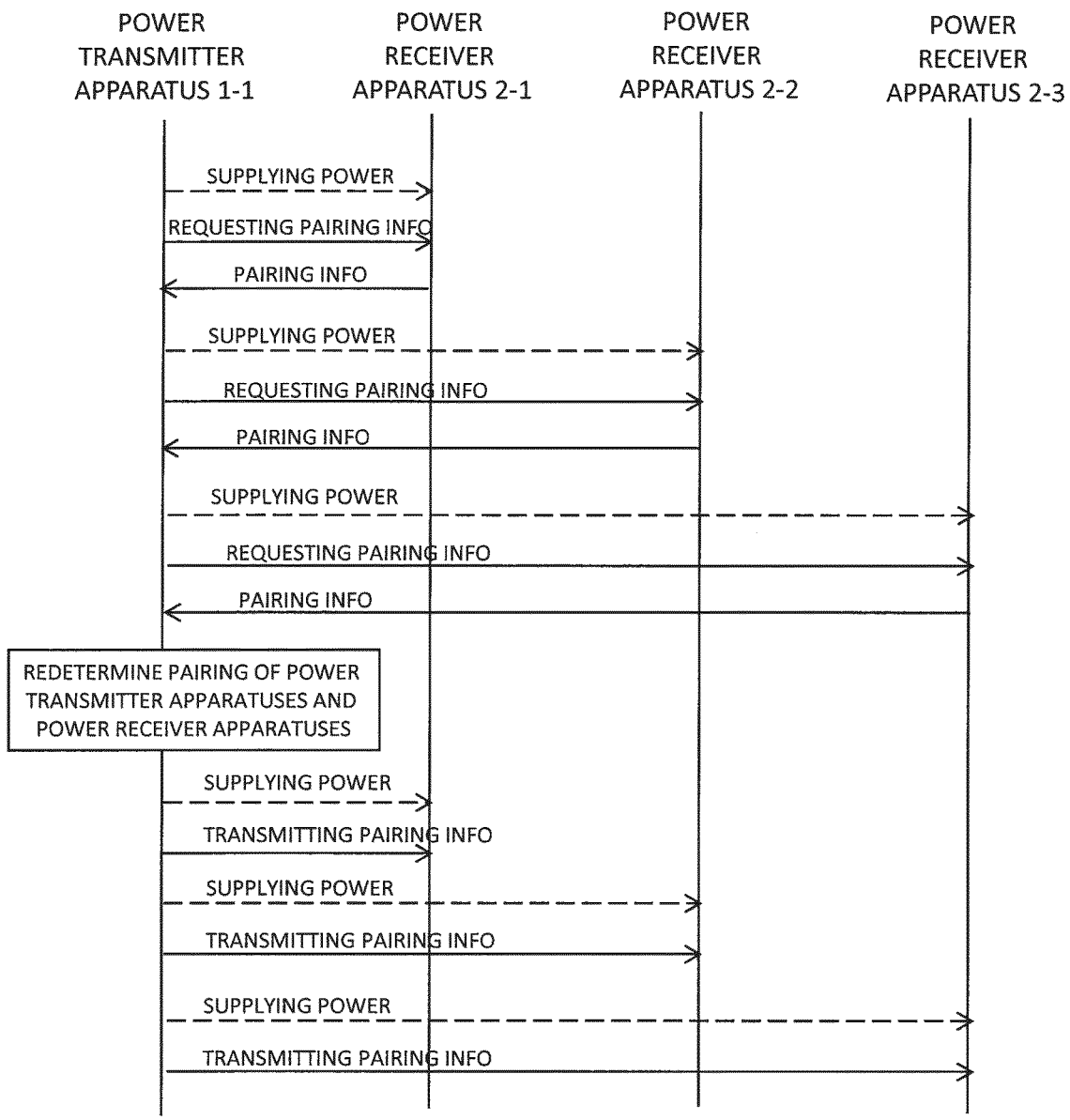
FIG. 16 is a sequence diagram showing schematic operations of the power transmitter apparatus 1-1 and the power receiver apparatuses 2-1 to 2-3 in the contention checking process of step S4 in FIG. 8.

FIG. 16 is a sequence diagram showing schematic operations of the power transmitter apparatus 1-1 and the power receiver apparatuses 2-1 to 2-3 in the contention checking process of step S4 in FIG. 8. It is determined whether or not contention of the power receiver apparatuses 2 occurs between the pairing determined by one power transmitter apparatus 1 executing the power transmission process of FIG. 8, and the pairing determined by the other power transmitter apparatuses 1, and if the contention occurs, the pairing is redetermined. The power transmitter apparatus 1-1 executes the contention checking process to determine the pairing of the power transmitter apparatuses 1 and the power receiving apparatuses 2 so that contention of the power receiver apparatuses 2 does not occur.

The other power transmitter apparatuses 1-2 and 1-3 also execute the contention checking process to determine the pairing of the power transmitter apparatuses 1 and the power receiver apparatuses 2 so that contention of the power receiver apparatuses 2 does not occur, in a manner similar to that of the power transmitter apparatus 1-1.

In the example of FIG. 24, the power transmitter apparatus 1-1 determines pairing such that the power transmitter apparatus 1-1 transmits power to the power receiver apparatus 2-2, and then, transmits the pairing information indicating the determined pairing, to the power receiver apparatuses 2-1 to 2-3. In the example of FIG. 25, the power transmitter apparatus 1-2 determines pairing such that the power transmitter apparatus 1-2 transmits power to the power receiver apparatus 2-1, based on the pairing information indicating that the power transmitter apparatus 1-1 transmits power to the power receiver apparatus 2-2, and then, the power transmitter apparatus 1-2 transmits the pairing information indicating the determined pairing, to the power receiver apparatuses 2-1 to 2-3. In the example of FIG. 26, the power transmitter apparatus 1-3 determines pairing such that the power transmitter apparatus 1-3 transmits power to the power receiver apparatus 2-3, based on the pairing information indicating that the power transmitter apparatus 1-1 transmits power to the power receiver apparatus 2-2 and that the power transmitter apparatus 1-2 transmits power to the power receiver apparatus 2-1, and then, the power transmitter apparatus 1-3 transmits the pairing information indicating the determined pairing, to the power receiver apparatuses 2-1 to 2-3. The pairing information determined by each of the power transmitter apparatuses 1 is transmitted to all the power receiver apparatuses 2. Therefore, even when a power transmitter apparatus 1 cannot receive estimated power values from a certain power receiver apparatus 2, but if the power transmitter apparatus 1 can acquire estimated power values and pairing information from another power receiver apparatus 2, it is possible to determine the pairing of the power transmitter apparatuses 1 and the power receiver apparatuses 2 so that contention of the power receiver apparatuses 2 does not occur.

Advantageous Effects of Embodiment

According to the wireless power transmission system of the embodiment, it is possible to determine the pairing of the power transmitter apparatuses 1 and the power receiver apparatuses 2 for power transmission so that the estimated received power of each of the power receiver apparatuses 2 is equal to or higher than the predetermined threshold. In addition, according to the wireless power transmission system of the embodiment, the plurality of power transmitter apparatuses 1 can determine the pairing independently of each other, without need for an external control apparatus to control the plurality of power transmitter apparatuses 1.

In addition, according to the wireless power transmission system of the embodiment, the pairing of the power transmitter apparatuses 1 and the power receiver apparatuses 2 for power transmission may be determined so as to maximize the total estimated received power of the plurality of power receiver apparatuses 2.

In addition, according to the wireless power transmission system of the embodiment, it is not necessary to perform complex signal processing by the power receiver apparatuses 2 (for example, estimation of received power), nor communicate among the power receiver apparatuses 2. Therefore, it is possible to determine the pairing of the power transmitter apparatuses 1 and the power receiver apparatuses 2 for power transmission, without significantly increasing power consumption of the power receiver apparatuses 2.

Modified Embodiments

The power receiver apparatus 2 may be provided with a load device other than a sensor, which operates by the electric power supplied from the power transmitter apparatus 1.

In the pairing process of step S3 in FIG. 8, when failing in the pairing of the power transmitter apparatuses 1 and the power receiver apparatuses (that is, failing in determining the power receiver apparatus 2 to which the power transmitter apparatus 1 transmits power), the power transmitter control circuit 10 of the power transmitter apparatus 1 may display an error message on the display device 13.

Summary of Embodiments

The wireless power transmitter apparatus and the wireless power transmission system according to the aspects of the present disclosure may be represented as follows.

According to a wireless power transmitter apparatus of a second aspect of the present disclosure, a wireless power transmitter apparatus (1) is provided for a wireless power transmission system including a plurality of wireless power transmitter apparatuses (1) and a plurality of wireless power receiver apparatuses (2). The wireless power transmitter apparatus (1) is provided with: a power estimator (17), a signal transmitting circuit (15), a signal receiving circuit, a power transmitter control circuit (10), and a power transmitting circuit (14). The power estimator (17) calculates a plurality of first estimated power values, each of the first estimated power values indicating estimated received power of a corresponding one of the wireless power receiver apparatuses (2) when the wireless power transmitter apparatus (1) transmits power to the plurality of wireless power receiver apparatuses (2). The signal transmitting circuit (15) transmits each of the first estimated power values to a corresponding one of the wireless power receiver apparatuses (2). The signal receiving circuit receives a plurality of second estimated power values from the wireless power receiver apparatuses (2), each of the second estimated power values indicating estimated received power of a corresponding one of the wireless power receiver apparatuses (2) when other wireless power transmitter apparatuses (1) of the wireless power transmission system transmit power to the wireless power receiver apparatuses (2). The power transmitter control circuit (10) determines pairing of the wireless power transmitter apparatuses (1) and the wireless power receiver apparatuses (2) for power transmission, based on the first and second estimated power values, so that estimated received power of each of the wireless power receiver apparatuses (2) is equal to or higher than a predetermined threshold. The power transmitting circuit (14) transmits power to one of the wireless power receiver apparatuses (2) corresponding to the wireless power transmitter apparatus (1), based on the determined pairing. The power estimator (17) calculates each of the first estimated power values based on a signal level of a test signal received from each of the wireless power receiver apparatuses (2).

According to a wireless power transmitter apparatus of a second aspect of the present disclosure, in the wireless power transmitter apparatus of the first aspect, the power transmitter control circuit (10) determines the pairing of the wireless power transmitter apparatuses (1) and the wireless power receiver apparatuses (2) for power transmission, so as to maximize total estimated received power of the plurality of wireless power receiver apparatuses (2) based on the first and second estimated power values.

According to a wireless power transmitter apparatus of a third aspect of the present disclosure, in the wireless power transmitter apparatus of the first or second aspect, the signal transmitting circuit (15) transmits first pairing information indicating the determined pairing, to each of the wireless power receiver apparatuses (2). The signal receiving circuit receives second pairing information from each of the wireless power receiver apparatuses (2), the second pairing information indicating pairing determined by the other wireless power transmitter apparatuses (1) of the wireless power transmission system. The power transmitter control circuit (10) determines the pairing of the wireless power transmitter apparatus (1) so as to exclude wireless power receiver apparatuses (2) included in the pairing determined by the other wireless power transmitter apparatuses (1) of the wireless power transmission system.

According to a wireless power transmitter apparatus of a fourth aspect of the present disclosure, in the wireless power transmitter apparatus of any one of the first to third aspects, the wireless power transmitter apparatus (1) is provided with an antenna device having variable directivity.

According to a wireless power transmission system of a fifth aspect of the present disclosure, a wireless power transmission system includes: the plurality of wireless power transmitter apparatuses (1) of any one of the first to fourth aspects; and a plurality of wireless power receiver apparatuses (2).

According to a wireless power transmission system of a sixth aspect of the present disclosure, in the wireless power transmission system of the fifth aspect, the wireless power receiver apparatus (2) is provided with a sensor (23) for measuring a predetermined physical quantity, and wirelessly transmits the physical quantity measured by the sensor (23) to the wireless power transmitter apparatus (1).

INDUSTRIAL APPLICABILITY

The wireless power transmission system according to the aspect of the present disclosure is available for, e.g., supplying power to each of a plurality of sensors in a sensor network including the sensors.

REFERENCE SIGNS LIST 1-1 to 1-3: POWER TRANSMITTER APPARATUS
2-1 to 2-3: POWER RECEIVER APPARATUS
10: POWER TRANSMITTER CONTROL CIRCUIT
11: POWER SUPPLY DEVICE
12: STORAGE DEVICE
13: DISPLAY DEVICE
14: POWER TRANSMITTING CIRCUIT
15: SIGNAL TRANSMITTING CIRCUIT
16: ANTENNA CONTROL CIRCUIT
17: POWER ESTIMATOR
18: SIGNAL RECEIVING CIRCUIT
19: CIRCULATOR CIRCUIT
20: POWER RECEIVER CONTROL CIRCUIT
21: BATTERY
22: STORAGE DEVICE
23: SENSOR
24: SIGNAL TRANSMITTING CIRCUIT
25: POWER RECEIVING CIRCUIT
26: SIGNAL RECEIVING CIRCUIT
27: CIRCULATOR CIRCUIT
31: DIVIDER
32-1 to 32-4: CIRCULATOR
33: COMBINER
41: PHASE AND AMPLITUDE ADJUSTER
42-1 to 42-4: ANTENNA ELEMENT
ANT1, ANT2: ANTENNA DEVICE

The invention claimed is:
1. A wireless power transmitter apparatus for a wireless power transmission system including a plurality of wireless power transmitter apparatuses and a plurality of wireless power receiver apparatuses, the wireless power transmitter apparatus comprising:
- a power estimator that calculates a plurality of first estimated power values, each of the first estimated power values indicating estimated received power of a corresponding one of the wireless power receiver apparatuses when the wireless power transmitter apparatus transmits power to the plurality of wireless power receiver apparatuses;
- a signal transmitting circuit that transmits each of the first estimated power values to a corresponding one of the wireless power receiver apparatuses;
- a signal receiving circuit that receives a plurality of second estimated power values from the wireless power receiver apparatuses, each of the second estimated power values indicating estimated received power of a corresponding one of the wireless power receiver apparatuses when other wireless power transmitter apparatuses of the wireless power transmission system transmit power to the wireless power receiver apparatuses;
- a power transmitter control circuit that determines pairing of the wireless power transmitter apparatuses and the wireless power receiver apparatuses for power transmission, based on the first and second estimated power values, so that estimated received power of each of the wireless power receiver apparatuses is equal to or higher than a predetermined threshold; and
- a power transmitting circuit that transmits power to one of the wireless power receiver apparatuses corresponding to the wireless power transmitter apparatus, based on the determined pairing,
- wherein the power estimator calculates each of the first estimated power values based on a signal level of a test signal received from each of the wireless power receiver apparatuses.

2. The wireless power transmitter apparatus according to claim 1,
- wherein the power transmitter control circuit determines the pairing of the wireless power transmitter apparatuses and the wireless power receiver apparatuses for power transmission, so as to maximize total estimated received power of the plurality of wireless power receiver apparatuses based on the first and second estimated power values.

3. The wireless power transmitter apparatus according to claim 1,
- wherein the signal transmitting circuit transmits first pairing information indicating the determined pairing, to each of the wireless power receiver apparatuses,
- wherein the signal receiving circuit receives second pairing information from each of the wireless power receiver apparatuses, the second pairing information indicating pairing determined by the other wireless power transmitter apparatuses of the wireless power transmission system, and
- wherein the power transmitter control circuit determines the pairing of the wireless power transmitter apparatus so as to exclude wireless power receiver apparatuses included in the pairing determined by the other wireless power transmitter apparatuses of the wireless power transmission system.

4. The wireless power transmitter apparatus according to claim 1,
- wherein the wireless power transmitter apparatus comprises an antenna device having variable directivity.

5. A wireless power transmission system including:
- a plurality of wireless power transmitter apparatuses; and
- a plurality of wireless power receiver apparatuses,
- wherein each of the plurality of wireless power transmitter apparatuses comprises:
  - a power estimator that calculates a plurality of first estimated power values, each of the first estimated power values indicating estimated received power of a corresponding one of the wireless power receiver apparatuses when the wireless power transmitter apparatus transmits power to the plurality of wireless power receiver apparatuses;
  - a signal transmitting circuit that transmits each of the first estimated power values to a corresponding one of the wireless power receiver apparatuses;
  - a signal receiving circuit that receives a plurality of second estimated power values from the wireless power receiver apparatuses, each of the second estimated power values indicating estimated received power of a corresponding one of the wireless power receiver apparatuses when other wireless power transmitter apparatuses of the wireless power transmission system transmit power to the wireless power receiver apparatuses;
  - a power transmitter control circuit that determines pairing of the wireless power transmitter apparatuses and the wireless power receiver apparatuses for power transmission, based on the first and second estimated power values, so that estimated received power of each of the wireless power receiver apparatuses is equal to or higher than a predetermined threshold; and
  - a power transmitting circuit that transmits power to one of the wireless power receiver apparatuses corresponding to the wireless power transmitter apparatus, based on the determined pairing,
  - wherein the power estimator calculates each of the first estimated power values based on a signal level of a test signal received from each of the wireless power receiver apparatuses.

6. The wireless power transmission system according to claim 5, wherein the wireless power receiver apparatus comprises a sensor for measuring a predetermined physical quantity, and wirelessly transmits the physical quantity measured by the sensor to the wireless power transmitter apparatus.

* * * * *